United States Patent
Sato

(10) Patent No.: US 11,050,071 B2
(45) Date of Patent: Jun. 29, 2021

(54) INSPECTION DEVICE AND INSPECTION METHOD

(71) Applicant: TOYOTA JIDOSHA KABUSHIKI KAISHA, Toyota (JP)

(72) Inventor: Katsumi Sato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 16/727,071

(22) Filed: Dec. 26, 2019

(65) Prior Publication Data
US 2020/0235413 A1    Jul. 23, 2020

(30) Foreign Application Priority Data

Jan. 21, 2019 (JP) .............................. JP2019-007423

(51) Int. Cl.
*H01M 8/04* (2016.01)
*H01M 8/02* (2016.01)
*H01M 8/0438* (2016.01)
*H01M 8/04746* (2016.01)
*H01M 8/026* (2016.01)

(52) U.S. Cl.
CPC ....... *H01M 8/04425* (2013.01); *H01M 8/026* (2013.01); *H01M 8/04783* (2013.01)

(58) Field of Classification Search
CPC .... H01M 8/026; H01M 8/043; H01M 8/0438; H01M 8/04425; H01M 8/04432; H01M 8/04664; H01M 8/04746; H01M 8/04783; Y02E 60/50
See application file for complete search history.

(56) References Cited

U.S. PATENT DOCUMENTS

2009/0239105 A1* 9/2009 Yoshida ............ H01M 8/04432
429/424

FOREIGN PATENT DOCUMENTS

JP    2001-023665 A     1/2001
JP    2002-334713    * 11/2002
(Continued)

*Primary Examiner* — Brittany L Raymond
(74) *Attorney, Agent, or Firm* — Dickinson Wright PLLC

(57) ABSTRACT

There is provided an inspection method for a fuel cell or a fuel cell stack that ensures performing a leakage inspection minutely in a shorter time compared with the conventional inspection. The inspection method includes an enclosing step, an external leakage inspection step, and a communication leakage inspection step. The enclosing step encloses a first gas passage, a second gas passage, and a refrigerant passage in the fuel cell or the fuel cell stack to form three sections. The three sections are a first section, a second section, and a third section independent of one another. The external leakage inspection step simultaneously supplies an inspection gas to two or more sections among the three sections for pressure boosting to perform an inspection for leakage of the inspection gas from the two or more sections after boosting pressures to an outside. The communication leakage inspection step decompresses one section among the two or more sections after boosting the pressures and maintains a pressure of another one section or pressures of other two sections to perform an inspection for leakage of the inspection gas from the pressure-maintained one section or two sections to the decompressed one section.

15 Claims, 8 Drawing Sheets

(56) References Cited

FOREIGN PATENT DOCUMENTS

| | | | |
|---|---|---|---|
| JP | 2002-334713 | A | 11/2002 |
| JP | 2016-042413 | A | 3/2016 |

\* cited by examiner

INSPECTION DEVICE AND INSPECTION METHOD

CROSS REFERENCE TO RELATED APPLICATIONS

The present application claims priority from Japanese patent application JP 2019-007423 filed on Jan. 21, 2019, the entire content of which is hereby incorporated by reference into this application.

BACKGROUND

Technical Field

The present disclosure relates to an inspection device and an inspection method for a fuel cell or a fuel cell stack.

Background Art

A disclosure regarding a technique that conducts a leakage test on a fuel cell stacked body in which solid electrolyte membranes and separators are stacked has been conventionally known (see JP 2001-23665 A). An object of the disclosure described in JP 2001-23665 A is to efficiently conduct the leakage test to improve production efficiency of fuel cell devices, and the disclosure provides the following solution (see abstract and the like in the literature).

In production of a manifold built-in fuel cell devices, a leakage test method of JP 2001-23665 A stacks a predetermined numbers of the separators, the electrolyte membranes, and the like constituting the fuel cell device on a lower block, places an upper block on it, and fastens with nuts. Holding for a predetermined period in the state completes bonding of the fuel cell stacked body. Afterwards, inspection fluid, such as nitrogen gas, is supplied from inspection fluid supply passages disposed on the lower block or the upper block to manifolds inside the fuel cell device for the leakage test of a fuel cell device.

Additionally, another disclosure regarding a fluid leakage inspection method for a fuel cell device has also been known (see JP 2002-334713 A). An object of the disclosure described in JP 2002-334713 A is to provide the fluid leakage inspection method for the fuel cell device that can determine that fluid leaks from which fluid flow passage to which fluid flow passage, or from which fluid flow passage to the outside, and the disclosure provides the following solution (see abstract and the like in the literature).

The fluid leakage inspection method for the fuel cell device of JP 2002-334713 A injects inspection fluid, for example, helium gas to respective fluid flow passages for fuel gas, oxidizing gas, and refrigerant used for the fuel cell devices in sequence and detects a leakage of the inspection fluid at the time of every injection of each inspection fluid. A leakage detection step from a hydrogen chamber is divided into a leakage detection step to an oxygen chamber and a leakage detection step to outside the oxygen chamber. The leakage detection step to the oxygen chamber is performed prior to the leakage detection step to outside the oxygen chamber.

SUMMARY

According to the disclosure described in JP 2001-23665 A, after completion of the bonding of the fuel cell stacked body, the leakage test can be directly conducted. Therefore, the leakage test is efficiently conducted, and eventually the production efficiency of the fuel cell devices can be improved. Additionally, the disclosure described in JP 2002-334713 A can determine that a leakage occurs from which fluid flow passage to which fluid flow passage or from which fluid flow passage to the outside. Such a leakage inspection of a fuel cell or a fuel cell stack has been desired to be performed minutely in a shorter time compared with the conventional inspection.

The present disclosure provides an inspection device and an inspection method for a fuel cell or a fuel cell stack that ensures performing a leakage inspection minutely in a shorter time compared with the conventional inspection.

One aspect of the present disclosure is an inspection method for a fuel cell or a fuel cell stack including: an enclosing step of enclosing a first gas passage, a second gas passage, and a refrigerant passage in the fuel cell or the fuel cell stack from an outside to form three sections, the three sections being a first section, a second section, and a third section independent of one another; an external leakage inspection step of simultaneously supplying an inspection gas to two or more sections among the three sections for pressure boosting to perform an inspection for leakage of the inspection gas from the two or more sections to the outside after boosting pressures; and a communication leakage inspection step of decompressing one section among the two or more sections after boosting the pressures while maintaining a pressure of another one section or pressures of other two sections to perform an inspection for leakage of the inspection gas from the pressure-maintained one section or two sections to the decompressed one section.

Another one aspect of the present disclosure is an inspection device for a fuel cell or a fuel cell stack that includes an enclosing unit, a gas supply unit, a pressure gauge, a control valve, and a control arithmetic unit. The enclosing unit encloses a first gas passage, a second gas passage, and a refrigerant passage in the fuel cell or the fuel cell stack from an outside to form three sections. The three sections are a first section, a second section, and a third section independent of one another. The gas supply unit independently supplies each of the three sections with an inspection gas for pressure boosting. The pressure gauge measures a pressure at each of the sections. The control valve is capable of discharging the inspection gas from each of the sections. The control arithmetic unit controls the gas supply unit and the control valve. The control arithmetic unit performs an inspection for leakage of the inspection gas from each of the sections based on the pressure measured by the pressure gauge. The control arithmetic unit simultaneously supplies the inspection gas to two or more sections among the three sections for pressure boosting to perform an inspection for external leakage of the inspection gas from the two or more sections to the outside after boosting the pressures. The control arithmetic unit subsequently decompresses one section among the two or more sections after boosting the pressures and maintains a pressure of another one section or pressures of other two sections to perform an inspection for communication leakage of the inspection gas from the pressure-maintained one section or two sections to the decompressed one section.

With the present disclosure, the inspection device and the inspection method for the fuel cell or the fuel cell stack that ensures performing the leakage inspection minutely in a shorter time compared with the conventional inspection can be provided.

DETAILED DESCRIPTION

The following describes embodiments of an inspection method and an inspection device according to the present disclosure with reference to the drawings. The following first describes general configurations of a fuel cell stack and a fuel cell as inspection targets, next describes a configuration of the inspection device performing a leakage inspection of the fuel cell stack or the fuel cell, and finally describes the inspection method using the inspection device.

(Fuel Cell Stack and Fuel Cell)

Figure 1:
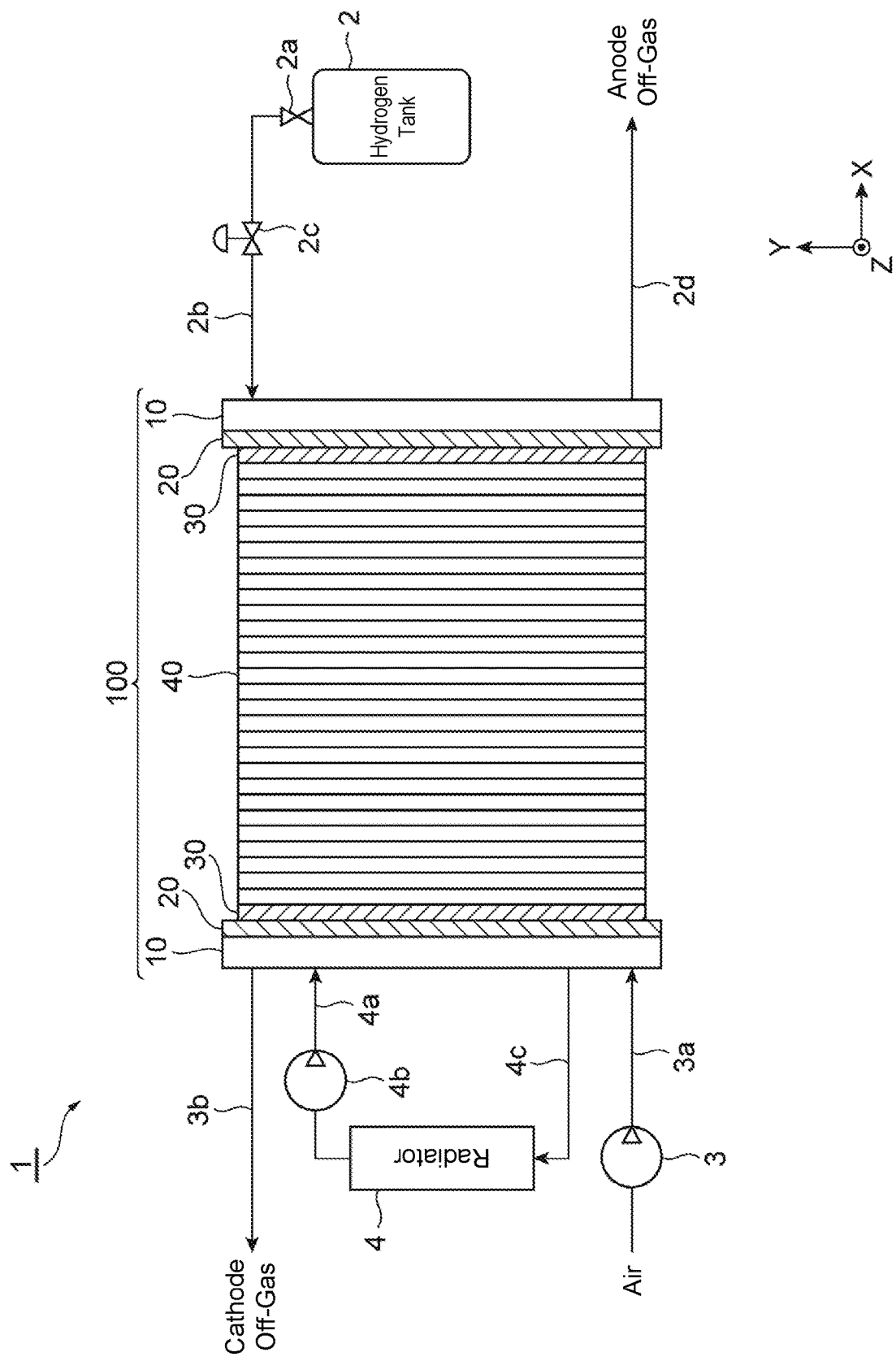
FIG. 1 is a schematic diagram of a fuel cell system including a fuel cell stack.
Figure 2:
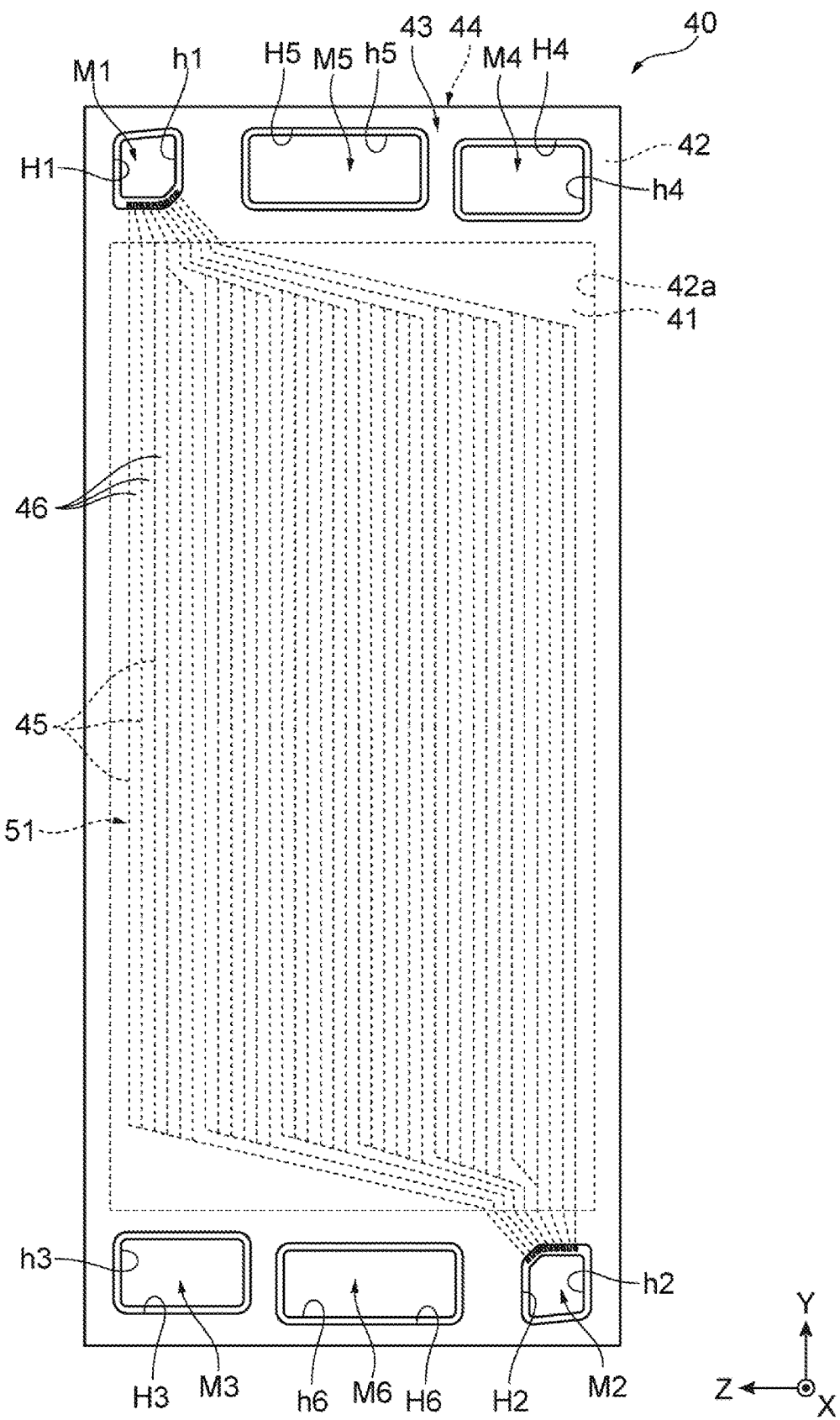
FIG. 2 is a plan view of a fuel cell constituting the fuel cell stack illustrated in FIG. 1.
Figure 3:
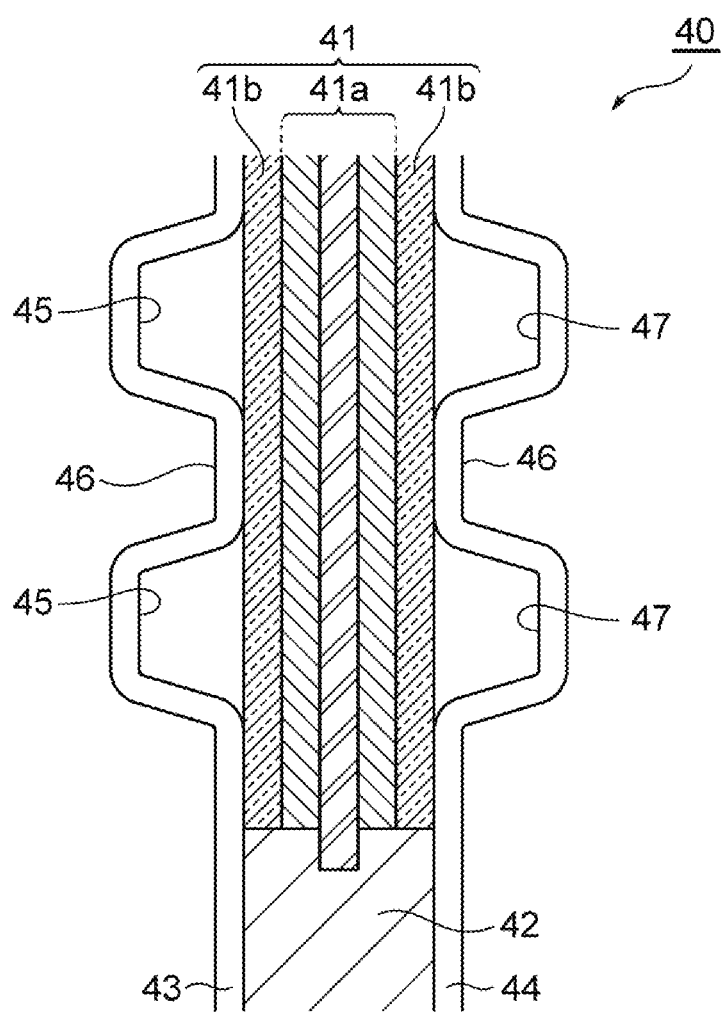
FIG. 3 is an enlarged cross-sectional view of the fuel cell illustrated in FIG. 2.

First, the following describes an example of general configurations of a fuel cell stack 100 and a fuel cell 40 with reference to FIG. 1 to FIG. 3. FIG. 1 is a schematic diagram of a fuel cell system 1 including the fuel cell stack 100. The fuel cell system 1 includes, for example, a hydrogen tank 2, an air pump 3, a radiator 4, and the fuel cell stack 100.

The hydrogen tank 2 is filled with, for example, high pressure hydrogen and is coupled to the fuel cell stack 100 via a shut valve 2a, a pipe 2b, and a regulator 2c to supply the fuel cell stack 100 with hydrogen as a fuel gas. A fuel gas (anode off-gas) not used in the fuel cell stack 100 is discharged outside the fuel cell stack 100 via a discharge pipe 2d coupled to the fuel cell stack 100. The fuel cell system 1 may include a recirculation mechanism that recirculates the anode off-gas to the pipe 2b side.

The air pump 3 is coupled to, for example, the fuel cell stack 100 via a pipe 3a to supply the fuel cell stack 100 with air as an oxidant gas. An oxidant gas (cathode off-gas) not used in the fuel cell stack 100 is discharged outside the fuel cell stack 100 via a discharge pipe 3b. The fuel gas and the oxidant gas are also referred to as reactant gas.

The radiator 4 is coupled to, for example, the fuel cell stack 100 via a pipe 4a and a pump 4b to supply refrigerant to cool the fuel cell stack 100 to the fuel cell stack 100. Refrigerant discharged from the fuel cell stack 100 is circulated to the radiator 4 via a pipe 4c. As the refrigerant, for example, water, antifreeze, such as ethylene glycol, air, and the like are used.

The fuel cell stack 100 has a stacked structure in which an end plate 10, an insulating plate 20, a collecting plate 30, a plurality of fuel cells 40, the collecting plate 30, the insulating plate 20, and the end plate 10 are stacked in this order.

FIG. 2 is a plan view of the fuel cell 40 constituting the fuel cell stack 100 illustrated in FIG. 1. FIG. 3 is a schematic enlarged cross-sectional view of the fuel cell 40 illustrated in FIG. 2. The fuel cell 40 includes a Membrane-Electrode-Gas Diffusion Layer Assembly (MEGA) 41, a frame portion 42 surrounding the MEGA 41, and a pair of separators 43 and 44 between which the MEGA 41 and the frame portion 42 are sandwiched.

The MEGA 41 includes a membrane-electrode assembly 41a and gas diffusion layers 41b, which are stacked on both sides of the membrane-electrode assembly 41a, and is disposed in a rectangular opening 42a of the frame portion 42. The membrane-electrode assembly 41a includes an anode and a cathode in respective both surfaces of an electrolyte membrane and generates electricity through reaction between a first gas and a second gas for electric generation. The first gas is, for example, a fuel gas containing hydrogen, and the second gas is, for example, an oxidant gas, such as air, containing oxygen.

The frame portion 42, for example, has an electrical insulating property and flexibility. By performing a punching work on a film-shaped resin member on which thermal welding can be performed, the frame portion 42 is formed into a rectangular frame shape surrounding the MEGA 41. The frame portion 42 is, for example, welded to the pair of separators 43 and 44 and also functions as a joint material that joins the pair of separators 43 and 44. The frame portion 42 includes a plurality of manifold openings h1 to h6 constituting manifolds M1 to M6 in its outer circumference.

The separators 43 and 44 are manufactured of a material having a gas cut-off property and a conductive property, for example, a member made of carbon, such as dense carbon produced by compressing carbon particles and manufactured to be impermeable to gas, and/or a metal member, such as press-formed stainless steel and titanium, and the like. Among the pair of separators 43 and 44, one is the anode side separator 43 and the other is the cathode side separator 44.

The anode side separator 43 includes a plurality of stripe-shaped flow passage grooves 45 distributing the fuel gas to a surface on the MEGA 41 side and a plurality of stripe-shaped flow passage grooves 46 distributing the refrigerant to a surface on a side opposite to the MEGA 41. The cathode side separator 44 includes a plurality of stripe-shaped flow passage grooves 47 distributing the oxidant gas to a surface on the MEGA 41 side and the plurality of stripe-shaped flow passage grooves 46 distributing the refrigerant to a surface on a side opposite to the MEGA 41.

The pair of separators 43 and 44 have a plurality of manifold holes H1 to H6 constituting the manifolds M1 to M6. The manifold M1 is, for example, coupled to the pipe 2b, which supplies the fuel gas, via openings provided in the end plate 10, the insulating plate 20, and the collecting plate 30 illustrated in FIG. 1. The manifold M2 is, for example, coupled to the discharge pipe 2d, which discharges the fuel gas not used in the fuel cell stack 100, via openings provided in the end plate 10, the insulating plate 20, and the collecting plate 30 illustrated in FIG. 1.

Similarly, the manifold M3 is, for example, coupled to the pipe 3a, which supplies the oxidant gas, via openings provided in the end plate 10, the insulating plate 20, and the collecting plate 30 illustrated in FIG. 1. The manifold M4 is, for example, coupled to the discharge pipe 3b, which discharges the oxidant gas not used in the fuel cell stack 100, via openings provided in the end plate 10, the insulating plate 20, and the collecting plate 30 illustrated in FIG. 1.

The manifold M5 is, for example, coupled to the pipe 4a, which supplies the refrigerant, via openings provided in the end plate 10, the insulating plate 20, and the collecting plate 30 illustrated in FIG. 1. Similarly, the manifold M6 is, for example, coupled to the pipe 4c, which circulates the refrigerant discharged from the fuel cell stack 100 to the radiator 4, via openings provided in the end plate 10, the insulating plate 20, and the collecting plate 30 illustrated in FIG. 1.

As illustrated in FIG. 2, the pair of separators 43 and 44, the frame portion 42, and the MEGA 41 form first gas flow passages 51 and second gas flow passages (not illustrated) as flow passages of the gases for electric generation. For example, the first gas flow passages 51 are disposed on the anode side of the fuel cell 40, and the second gas flow passages are disposed on the cathode side of the fuel cell 40. The first gas flow passages 51 have openings in the respective manifolds M1 and M2. The first gas flow passages 51 couple a space between the anode side separator 43 and the MEGA 41 and the manifolds M1 and M2 with groove-shaped flow passages disposed in the frame portion 42. The first gas flow passage 51 is branched into a plurality of flow passages by the plurality of stripe-shaped flow passage grooves 45 illustrated in FIG. 2 and FIG. 3 in the space between the anode side separator 43 and the MEGA 41.

The second gas flow passages (not illustrated) have openings in the respective manifolds M3 and M4. The second gas flow passages couple a space between the cathode side separator 44 and the MEGA 41 and the manifolds M3 and M4 with groove-shaped flow passages disposed in the frame portion 42. The second gas flow passage is branched into a plurality of flow passages by the plurality of stripe-shaped flow passage grooves 47 illustrated in FIG. 3 in the space between the cathode side separator 44 and the MEGA 41, similarly to the first gas flow passage 51 illustrated in FIG. 2.

With the above-described configuration, in the fuel cell system 1, the hydrogen gas is supplied as the fuel gas, for example, from the hydrogen tank 2 to the manifolds M1, which are formed with the manifold holes H1, in the plurality of fuel cells 40 constituting the fuel cell stack 100. Additionally, the air containing oxygen is supplied as the oxidant gas, for example, from the air pump 3 to the manifolds M3, which are formed with the manifold holes H3, in the plurality of fuel cells 40 constituting the fuel cell stack 100. Furthermore, cooling water is supplied as the refrigerant, for example, from the pump 4b to the manifolds M5, which are formed with the manifold holes H5, in the plurality of fuel cells 40 constituting the fuel cell stack 100.

The fuel gas supplied to the manifolds M1 in the fuel cell stack 100 flows through the first gas flow passages 51 in the respective fuel cells 40 toward the manifolds M2. The oxidant gas supplied to the manifolds M3 in the fuel cell stack 100 flows through the second gas flow passages in the respective fuel cells 40 toward the manifolds M4. The fuel cells 40 cause the fuel gas flowing through the first gas flow passages 51 and the oxidant gas flowing through the second gas flow passages to react to one another via the MEGAs 41 to generate electricity.

The refrigerant supplied to the manifolds M5 in the fuel cell stack 100 flows through refrigerant flow passages formed between the adjacent fuel cells 40 with the flow passage grooves 46 illustrated in FIG. 3 toward the manifolds M6. Thus, heat generated in the fuel cell 40 by the electric generation is moved to the refrigerant via the pair of separators 43 and 44, thereby ensuring cooling the fuel cell 40.

The fuel gas that has passed through the first gas flow passages 51 in the fuel cells 40 is discharged to the manifolds M2 and is further discharged from the manifolds M2 to the discharge pipe 2d. The oxidant gas that has passed through the second gas flow passages in the fuel cell 40 is discharged to the manifolds M4 and is further discharged from the manifolds M4 to the discharge pipe 3b. The refrigerant that has passed through the refrigerant flow passages between the adjacent fuel cells 40 is discharged to the manifolds M6 and is further discharged to the pipe 4c.

As described above, the fuel cell stack 100 or the fuel cells 40 include the three passages through which the three different kinds of fluids flow. More specifically, these three passages are, for example, a first gas passage through which the fuel gas flows, a second gas passage through which the oxidant gas flows, and a refrigerant passage through which the refrigerant flows. Note that the MEGAs 41 and the frame portions 42 separate between the first gas passage and the second gas passage. Between the first gas passage and second gas passage and the refrigerant passage are separated with the separators 43 and 44 and are appropriately sealed with seal portions, such as gaskets.

In this embodiment, the first gas passage in the fuel cell stack 100 includes, for example, the manifolds M1 and M2 formed with the plurality of fuel cells 40 and the first gas flow passages 51 in the plurality of fuel cells 40. Additionally, the second gas passage in the fuel cell stack 100 includes, for example, the manifolds M3 and M4 formed with the plurality of fuel cells 40 and the second gas flow passages in the plurality of fuel cells 40. Furthermore, the refrigerant passage in the fuel cell stack 100 includes, for example, the manifolds M5 and M6 formed with the plurality of fuel cells 40 and the refrigerant flow passages formed between the adjacent fuel cells 40.

In this embodiment, the first gas passage in the fuel cells 40 includes the manifold holes H1 and H2 in the pair of separators 43 and 44, the manifold openings h1 and h2 in the frame portions 42, and the first gas flow passages 51. The second gas passage in the fuel cells 40 includes, for example, the manifold holes H3 and H4 in the pair of separators 43 and 44, the manifold openings h3 and h4 in the frame portions 42, and the second gas flow passages. Furthermore, the refrigerant flow passage in the fuel cells 40 includes, for example, the manifold holes H5 and H6 in the pair of separators 43 and 44, the manifold openings h5 and h6 in the frame portions 42, and the flow passage grooves 46 on the outer sides of the pair of separators 43 and 44.

(Inspection Device)

Figure 4:
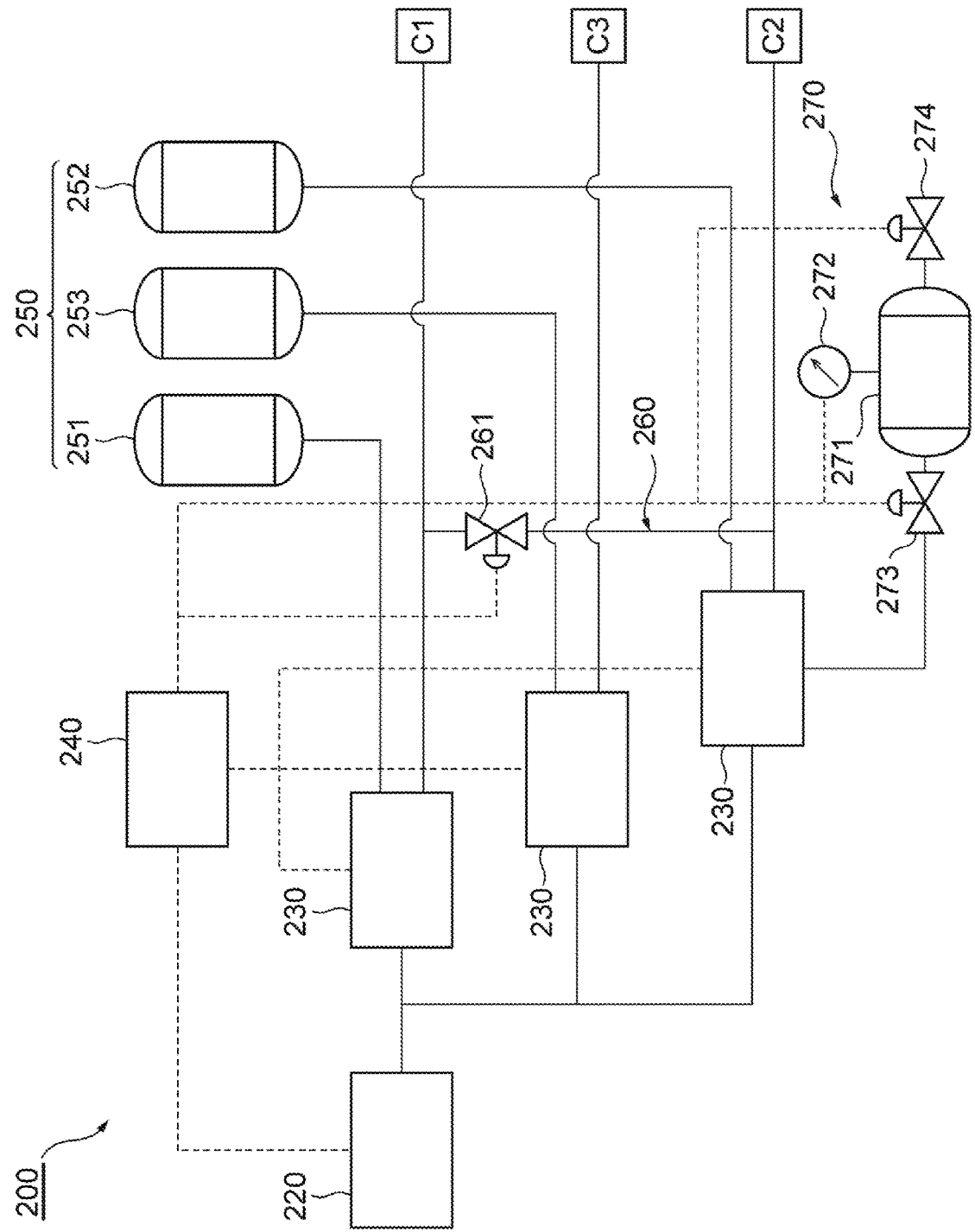
FIG. 4 is a block diagram illustrating a configuration of a part of an inspection device according to embodiments of the present disclosure.
Figure 5:
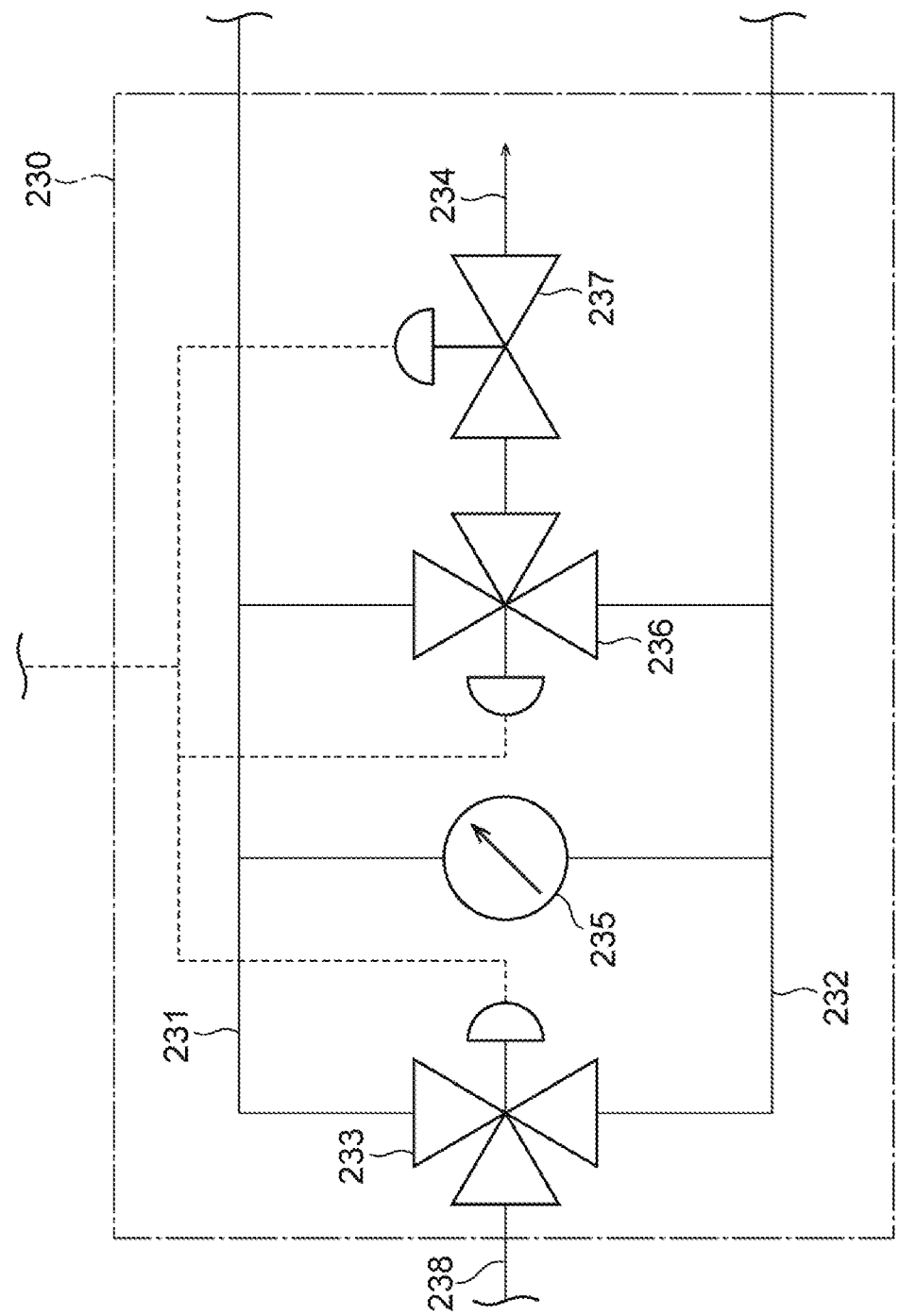
FIG. 5 is a block diagram illustrating a configuration of an inspection unit in the inspection device illustrated in FIG. 4.
Figure 6:
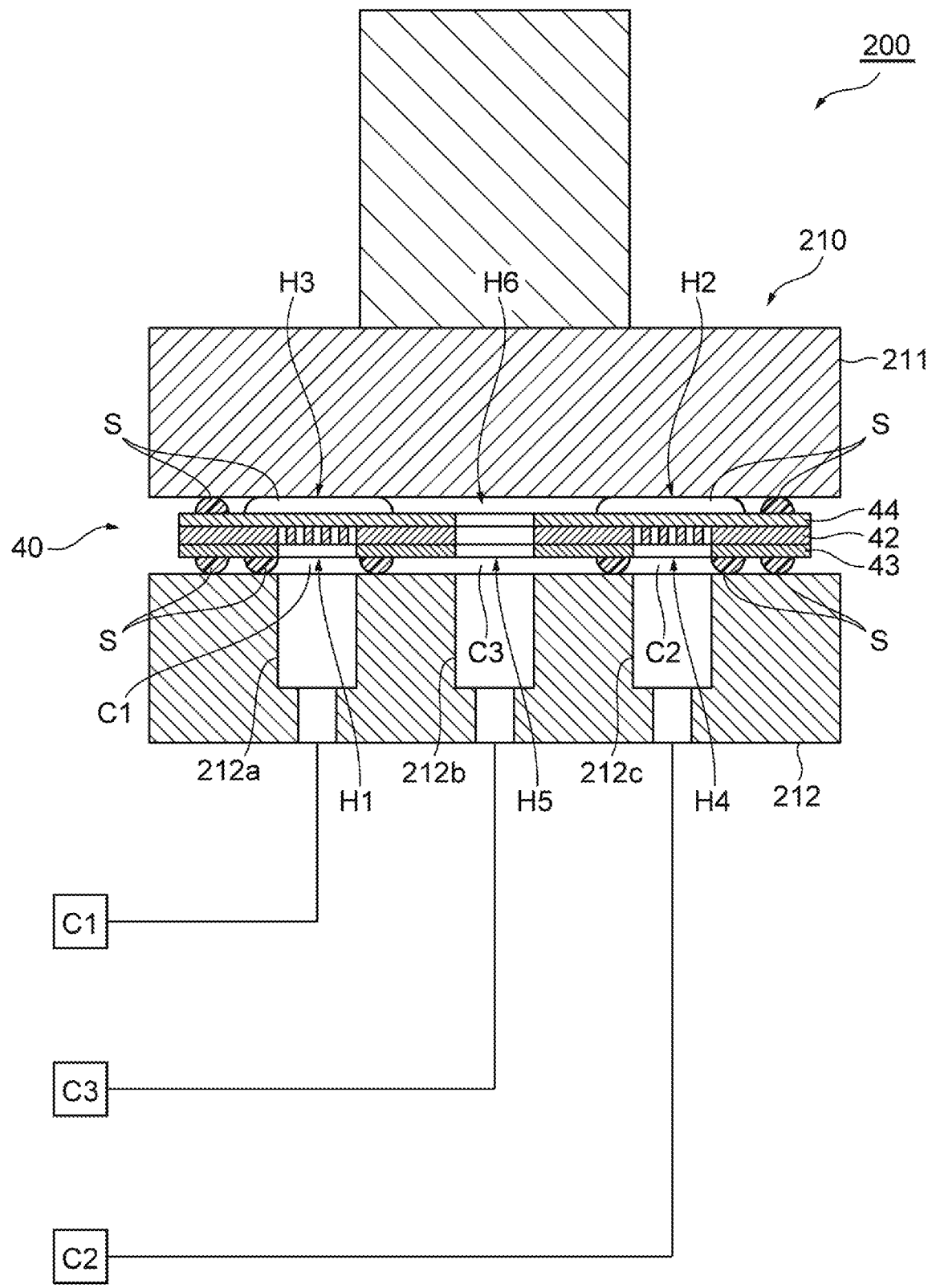
FIG. 6 is a block diagram illustrating a configuration of the remaining part of the inspection device illustrated in FIG. 4.

Next, with reference to FIG. 4 to FIG. 6, the following describes an example of a configuration of an inspection device 200 that performs the leakage inspection of the above-described fuel cell stack 100 or fuel cell 40. FIG. 4 is a block diagram illustrating a configuration of a part of the inspection device 200 according to the embodiments of the present disclosure. FIG. 5 is a block diagram illustrating a configuration of an inspection unit 230 in the inspection device 200 illustrated in FIG. 4. FIG. 6 is a block diagram illustrating a configuration of the remaining part of the inspection device 200 illustrated in FIG. 4. The inspection device 200 according to this embodiment is, for example, a device to perform the leakage inspection of the fuel cell stack 100 or the fuel cell 40 using an inspection gas.

The leakage inspection includes, for example, an inspection of an external leakage. The external leakage is a leakage of the inspection gas from the first gas passage, the second gas passage, and the refrigerant passage in the fuel cell stack 100 or the fuel cells 40 to the outside of the fuel cell stack 100 or the fuel cells 40. The leakage inspection includes, for example, an inspection of a communication leakage. The communication leakage is a leakage of the inspection gas from the first gas passage and the second gas passage to the refrigerant passage in the fuel cell stack 100 or the fuel cells 40. The leakage inspection includes, for example, an inspection of a cross leakage. The cross leakage is a leakage between the first gas passage and the second gas passage in the fuel cell stack 100 or the fuel cells 40. As described later, the leakage inspection judges success or failure based on, for example, an amount of leakage of the inspection gas. While the inspection gas is not especially limited, for example, a nitrogen gas, air, carbon dioxide, a helium gas, a hydrogen gas, and the like are usable.

Although the details will be described later, the inspection device 200 according to this embodiment is a device to inspect the fuel cell 40 or the fuel cell stack 100 and features the following configurations. The inspection device 200 includes an enclosing unit 210, a gas supply unit 220, pressure gauges 235, control valves 236, and a control arithmetic unit 240. The enclosing unit 210 encloses the first gas passage, the second gas passage, and the refrigerant passage in the fuel cells 40 or the fuel cell stack 100 from the outside to form three sections independent of one another: a first section C1, a second section C2, and a third section C3. The gas supply unit 220 independently supplies the inspection gas to the three respective sections for pressure boosting. The pressure gauges 235 measure pressures at the respective sections. The control valve 236 ensures discharging the inspection gas from each section. The control arithmetic unit 240 controls the gas supply unit 220 and the control valve 236 and performs the inspection for leakage of the inspection gas from each section based on the pressure measured by the pressure gauge 235. The control arithmetic unit 240 simultaneously supplies the inspection gas to two or more sections among the three sections for pressure boosting to perform the inspection for external leakage of the inspection gas from the two or more sections to the outside after boosting the pressures. Additionally, after performing the inspection for external leakage, the control arithmetic unit 240 decompresses one section among the two or more sections after boosting the pressures and maintains a pressure of the other one section or pressures of other two sections to perform the inspection for communication leakage of the inspection gas from the pressure-maintained one section or two sections to the decompressed one section.

The following describes an example of the configuration of the inspection device 200 in detail. In this embodiment, the inspection device 200 includes, for example, inspection units 230, a chamber 250, a coupling portion 260, and a precompression unit 270, in addition to the enclosing unit 210, the gas supply unit 220, the pressure gauge 235, the control valve 236, and the control arithmetic unit 240.

The following describes an example where the inspection device 200 performs the leakage inspection of one fuel cell 40. Note that, by replacing the fuel cell 40 with the fuel cell stack 100, the inspection device 200 can perform the leakage inspection of the fuel cell stack 100.

As illustrated in FIG. 6, for example, the enclosing unit 210 encloses the first gas passage, the second gas passage, and the refrigerant passage in the fuel cell 40 to form the first section C1, the second section C2, and the third section C3 independent of one another. More specifically, the enclosing unit 210 includes, for example, an upper form 211 and a lower form 212 and a drive unit (not illustrated).

For example, the upper form 211 is disposed to be movable in a direction of approaching the lower form 212 and a direction of separating from the lower form 212. The lower form 212 includes supply ports 212a, 212b, and 212c to independently supply the inspection gas to the respective first section C1, second section C2, and third section C3.

The drive unit in the enclosing unit 210 is, for example, controlled by the control arithmetic unit 240, relatively moves the upper form 211 and the lower form 212, and holds the fuel cell 40 sandwiched between the upper form 211 and the lower form 212. This encloses the first gas passage, the second gas passage, and the refrigerant passage in the fuel cell 40 by the enclosing unit 210, thus forming the first section C1, the second section C2, and the third section C3 independent of one another.

More specifically, the first section C1 is, for example, defined by the first gas passage, the manifold holes H1 and H2, and the manifold openings h1 and h2 in the fuel cell 40, the enclosing unit 210, and seal portions S sealing between these members. The second section C2 is, for example, defined by the second gas passage, the manifold holes H3 and H4, and the manifold openings h3 and h4 in the fuel cell 40, the enclosing unit 210, and the seal portions S sealing between these members. The third section C3 is defined by the refrigerant passage, the manifold holes H5 and H6, and the manifold openings h5 and h6 in the fuel cell 40, the enclosing unit 210, and the seal portions S sealing between these members. The seal portions S are disposed, for example, on the fuel cell 40. The seal portions S may be disposed on the enclosing unit 210.

The seal portions S surround the respective peripheral areas of the manifold holes H1 to H4 in the pair of separators 43 and 44 of the fuel cell 40. Accordingly, the seal portion S seals between the first section C1 and the third section C3, and the seal portion S seals between the second section C2 and the third section C3. The seal portions S are disposed into a frame shape across the whole circumferences of the separators 43 and 44 on peripheral edge portions of surfaces outer sides of the pair of separators 43 and 44. Thus, the seal portions S seal between the third section C3 and the outer sides of the fuel cell 40.

The gas supply unit 220 is, for example, controlled by the control arithmetic unit 240 coupled via a signal line and independently supplies the inspection gas to the respective sections: the first section C1, the second section C2, and the third section C3, for pressure boosting. More specifically, the gas supply unit 220 includes, for example, a tank in which the inspection gas is accumulated, a compressor, a control valve, a pressure gauge, and the like, and boosts pressure of the inspection gas to a predetermined pressure under the control by the control arithmetic unit 240 and supplies the inspection gas. The gas supply unit 220 is, for example, coupled to the respective sections via pipes branched into three systems and the inspection units 230 coupled to the pipes of the respective systems.

For example, the inspection units 230 are disposed by three in total, one for each of the first section C1, the second section C2, and the third section C3. The inspection units 230 are, for example, coupled to the gas supply unit 220, the respective sections, and the chamber 250 via the pipes and coupled to the control arithmetic unit 240 via signal lines. As illustrated in FIG. 5, the inspection unit 230 each includes, for example, a reference flow passage 231, an inspection flow passage 232, a supply control valve 233, an open flow passage 234, the pressure gauge 235, a control valve 236, and an open valve 237.

The supply control valves 233 are, for example, coupled to the gas supply unit 220 and the chamber 250 via pipes and coupled to the control arithmetic unit 240 via signal lines. The reference flow passage 231 supplies the inspection gas supplied from the gas supply unit 220 via the supply control valve 233 to the chamber 250 to boost pressure in the chamber 250. More specifically, the reference flow passage 231 in the inspection unit 230 coupled to the first section C1 via the inspection flow passage 232 is coupled to a first chamber 251. The reference flow passage 231 in the inspection unit 230 coupled to the second section C2 via the inspection flow passage 232 is coupled to a second chamber 252. The reference flow passage 231 in the inspection unit 230 coupled to the third section C3 via the inspection flow passage 232 is coupled to a third chamber 253.

The inspection flow passage 232 is coupled to any of the respective sections of the first section C1, the second section C2, and the third section C3. More specifically, the inspection flow passage 232 in the inspection unit 230 disposed between the gas supply unit 220 and the first section C1 is coupled to the first section C1. The inspection flow passage 232 in the inspection unit 230 disposed between the gas supply unit 220 and the second section C2 is coupled to the second section C2. The inspection flow passage 232 in the inspection unit 230 disposed between the gas supply unit 220 and the third section C3 is coupled to the third section C3.

The supply control valves 233 are coupled to the gas supply unit 220 via pipes 238 and distribute the inspection gas to the reference flow passages 231 and the inspection flow passages 232. More specifically, the supply control valve 233 is a three-way valve disposed between the pipe 238 and the reference flow passage 231 and the inspection flow passage 232. The supply control valve 233, for example, opens and closes between the pipe 238 and the reference flow passage 231 and inspection flow passage 232. Additionally, the supply control valve 233, for example, opens and closes between the reference flow passage 231 and the inspection flow passage 232. The supply control valves 233 are, for example, coupled to the control arithmetic unit 240 via signal lines, and the control arithmetic unit 240 controls the opening and closing.

The open flow passage 234 has one end opened to the outside and the other end coupled to the control valve 236. The open valve 237 is disposed in the middle of the open flow passage. Opening and closing the supply control valve 233, the control valve 236, and the open valve 237 couples the open flow passage 234 to at least one of the reference flow passage 231 or the inspection flow passage 232 to discharge the inspection gas filled in the first section C1, the second section C2, the third section C3, or the chamber 250 to the outside. This ensures the first section C1, the second section C2, the third section C3, and the chamber 250 to be individually decompressed.

The pressure gauges 235 measure pressures at the respective sections: the first section C1, the second section C2, and the third section C3. More specifically, the pressure gauge 235 in the inspection unit 230 coupled to the first section C1 measures the pressure at the first section C1 via the inspection flow passage 232. The pressure gauge 235 in the inspection unit 230 coupled to the second section C2 measures the pressure at the second section C2 via the inspection flow passage 232. The pressure gauge 235 in the inspection unit 230 coupled to the third section C3 measures the pressure at the third section C3 via the inspection flow passage 232.

Further, the pressure gauges 235 are, for example, differential pressure gauges that measure differential pressures between the three respective sections: the first section C1, the second section C2, and the third section C3, and the chamber 250. In detail, the pressure gauge 235 is, for example, coupled to the reference flow passage 231 and the inspection flow passage 232 in the inspection unit 230 corresponding to each section to measure a differential pressure between each section and the chamber 250. More specifically, the pressure gauge 235 in the inspection unit 230 coupled to the first section C1 measures a differential pressure between the first section C1 and the first chamber 251. The pressure gauge 235 in the inspection unit 230 coupled to the second section C2 measures a differential pressure between the second section C2 and the second chamber 252. The pressure gauge 235 in the inspection unit 230 coupled to the third section C3 measures a differential pressure between the third section C3 and the third chamber 253.

The control valve 236 is disposed such that the inspection gas can be discharged from each section: the first section C1, the second section C2, or the third section C3. Additionally, the control valve 236 is, for example, disposed such that the inspection gas can be discharged from each of the first chamber 251, the second chamber 252, and the third chamber 253. Specifically, the control valve 236 is, for example, a three-way valve that opens and closes between the reference flow passage 231 and the inspection flow passage 232, between the reference flow passage 231 and the open flow passage 234, and between the inspection flow passage 232 and the open flow passage 234. The control valves 236 are, for example, coupled to the control arithmetic unit 240 via signal lines, and the control arithmetic unit 240 controls the opening and closing.

The open valve 237 is a control valve that is disposed between an open end of the open flow passage 234 and the control valve 236 and opens and closes the open flow passage 234. The open valves 237 are, for example, coupled to the control arithmetic unit 240 via signal lines, and the control arithmetic unit 240 controls the opening and closing.

The control arithmetic unit 240 is constituted of, for example, a microcontroller or a computer unit including a central processing unit (CPU), a storage device, such as a memory, programs and data stored in the storage device, and an input/output unit of signals, and the like. The control arithmetic unit 240 controls the gas supply unit 220 and the control valves 236 and performs the inspection for leakage of the inspection gas from the respective sections: the first section C1, the second section C2, and the third section C3, based on the pressures measured by the pressure gauges 235.

The control arithmetic unit 240 simultaneously supplies the inspection gas to two or more sections among the three sections: the first section C1, the second section C2, and the third section C3, for pressure boosting to perform the inspection for external leakage of the inspection gas from the two or more sections to the outside after boosting the pressures.

That is, the control arithmetic unit 240 can simultaneously supply the inspection gas to two sections, for example, the first section C1 and the second section C2, for pressure boosting, and perform the inspection for external leakage from the first section C1 and the second section C2 after boosting the pressures. Additionally, the control arithmetic unit 240 can simultaneously supply the inspection gas to the three sections, for example, the first section C1, the second section C2, and the third section C3, for pressure boosting, and perform the inspection for external leakage from the three sections after boosting the pressures.

Further, after performing the inspection for external leakage, the control arithmetic unit 240 decompresses one section among the two or more sections after boosting the pressure, maintains the pressure of the other one section or the pressures of the other two sections, and performs the inspection for communication leakage of the inspection gas from the pressure-maintained one section or two sections to the decompressed one section.

That is, for example, after boosting the pressures of the two sections and performing the inspection for external leakage, the control arithmetic unit 240 can decompress one section among the two sections after boosting the pressures, maintain the pressure of the other one section, and perform the inspection for communication leakage of the inspection gas from the pressure-maintained one section to the decompressed one section. Additionally, for example, after boosting the pressures of the three sections and performing the inspection for external leakage, the control arithmetic unit 240 can decompress one section among the three sections after boosting the pressures, maintain the pressures of the other two sections, and perform the inspection for communication leakage of the inspection gas from the pressure-maintained two sections to the decompressed one section.

More specifically, for example, after boosting the pressures of the three sections and performing the inspection for external leakage, the control arithmetic unit 240 can decompress the third section C3 including the refrigerant passage and perform the inspection for communication leakage from the pressure-maintained first section C1 and second section C2 to the third section C3 in the inspection for communication leakage.

Additionally, for example, after performing the inspection for communication leakage, the control arithmetic unit 240 can decompress one section among the pressure-maintained first section C1 and second section C2, maintain the pressure at the other one section, and perform the inspection for cross leakage of the inspection gas from the pressure-maintained one section to the decompressed one section. In this case, the control arithmetic unit 240 can configure a pressure difference between before and after the decompression of the first section C1 or the second section C2 in the inspection for cross leakage so as to be smaller than a pressure difference between before and after the decompression of the third section C3 in the inspection for communication leakage. The control arithmetic unit 240 may discharge an inspection gas of one section to be decompressed to the precompression unit 270 where a precompression higher than an atmospheric pressure is given, in the inspection for cross leakage.

The control arithmetic unit 240, for example, can supply the inspection gas to the chamber 250 simultaneously with the three sections: the first section C1, the second section C2, and the third section C3, for pressure boosting in the inspection for external leakage. In this case, the control arithmetic unit 240, for example, can calculate the amount of leakage of the inspection gas based on the differential pressure between the chamber 250 and each section of the three sections to perform the inspection for leakage of the inspection gas.

More specifically, the control arithmetic unit 240, for example, can supply the inspection gas to the first chamber 251, the second chamber 252, and the third chamber 253 simultaneously with the three sections for pressure boosting in the inspection for external leakage. In this case, the control arithmetic unit 240, for example, can calculate the amount of leakage of the inspection gas based on at least one of the differential pressure between the first chamber 251 and the first section C1, the differential pressure between the second chamber 252 and the second section C2, or the differential pressure between the third chamber 253 and the third section C3.

More specifically, the control arithmetic unit 240 can calculate the amount of leakage of the inspection gas from each section based on, for example, the following calculation formulae. An equivalent capacitance of each section is defined as $VE$ [ml], a differential pressure between each section and the chamber 250 is defined as $\Delta P$ [Pa], a measured time is defined as $T$ [sec], and an amount of leakage is defined as $Q$ [ml/min]. At this time, the amount of leakage $Q$ can be obtained by the following formula (1).

$$Q = VE \times \{\Delta P/(1.013 \times 10^5)\} \times (60/T) \quad (1)$$

In a case that the amount of leakage is defined as $Q$mol [μmol/min], conversion formulae with the amount of leakage $Q$ [ml/min] are as the following formulae (2) and (3).

$$Q = Q\text{mol} \times (22.4 \times 10^{-3}) \quad (2)$$

$$Q\text{mol} = Q/(22.4 \times 10^{-3}) \quad (3)$$

The chamber 250 is a container coupled to the gas supply unit 220. Specifically, the chamber 250 is, for example, coupled to the gas supply unit 220 via the inspection units 230. In detail, the chamber 250 is, for example, coupled to the gas supply unit 220 via the reference flow passages 231 and the supply control valves 233 in the inspection units 230. More specifically, the chamber 250 includes the first chamber 251, the second chamber 252, and the third chamber 253.

The first chamber 251 is coupled to the gas supply unit 220 via the reference flow passage 231 and the supply control valve 233 in the inspection unit 230 corresponding to the first section C1. The second chamber 252 is coupled to the gas supply unit 220 via the reference flow passage 231 and the supply control valve 233 in the inspection unit 230 corresponding to the second section C2. The third chamber 253 is coupled to the gas supply unit 220 via the reference flow passage 231 and the supply control valve 233 in the inspection unit 230 corresponding to the third section C3.

The coupling portion 260 is a passage coupling the first section C1 including the first gas passage in the fuel cell 40 and the second section C2 including the second gas passage in the fuel cell 40. More specifically, the coupling portion 260 has one end coupled to the middle of a passage coupling the first section C1 and the inspection unit 230 corresponding to the first section C1. The coupling portion 260 has the other end coupled to the middle of a passage coupling the second section C2 and the inspection unit 230 corresponding to the second section C2. The coupling portion 260 includes a coupling valve 261.

The coupling valve 261 is, for example, a control valve that is coupled to the control arithmetic unit 240 via a signal line and opens and closes under control by the control arithmetic unit 240. For example, in the inspection for external leakage, when the control arithmetic unit 240 simultaneously supplies the inspection gas to the two sections, the first section C1 and the second section C2, for pressure boosting, or when the control arithmetic unit 240 simultaneously supplies the inspection gas to the three sections: the first section C1, the second section C2, and the third section C3 for pressure boosting, the control arithmetic unit 240 opens the coupling valve 261, and closes the coupling valve 261 after boosting the pressures of these two sections or three sections.

The precompression unit 270 is, for example, coupled to the open flow passage 234 in the inspection unit 230 corresponding to the second section C2. That is, in this embodiment, the open flow passage 234 in the inspection unit 230 corresponding to the second section C2 is not opened to the outside but is coupled to the precompression unit 270 to discharge the inspection gas to the precompression unit 270. The precompression unit 270 may be, for example, coupled to the open flow passage 234 in the inspection unit 230 corresponding to the first section C1. The precompression unit 270 includes, for example, a precompression chamber 271, a precompression gauge 272, an inlet valve 273, and an outlet valve 274.

The precompression chamber 271 is filled with the inspection gas, for example, from the gas supply unit 220 via the supply control valve 233, the control valve 236, and the open valve 237 of the open flow passage 234. The precompression gauge 272 is, for example, coupled to the control arithmetic unit 240 via a signal line to measure a pressure at the precompression chamber 271. The inlet valve 273 and the outlet valve 274 are disposed in an inlet and an outlet of the precompression chamber 271, respectively. The inlet valve 273 and the outlet valve 274 are control valves that are coupled to the control arithmetic unit 240 via signal lines and opened and closed under control by the control arithmetic unit 240.

Operations of the inspection device 200 according to this embodiment having the above-described configurations will be described later together with actions of the inspection method described below.

(Inspection Method)

Figure 7:
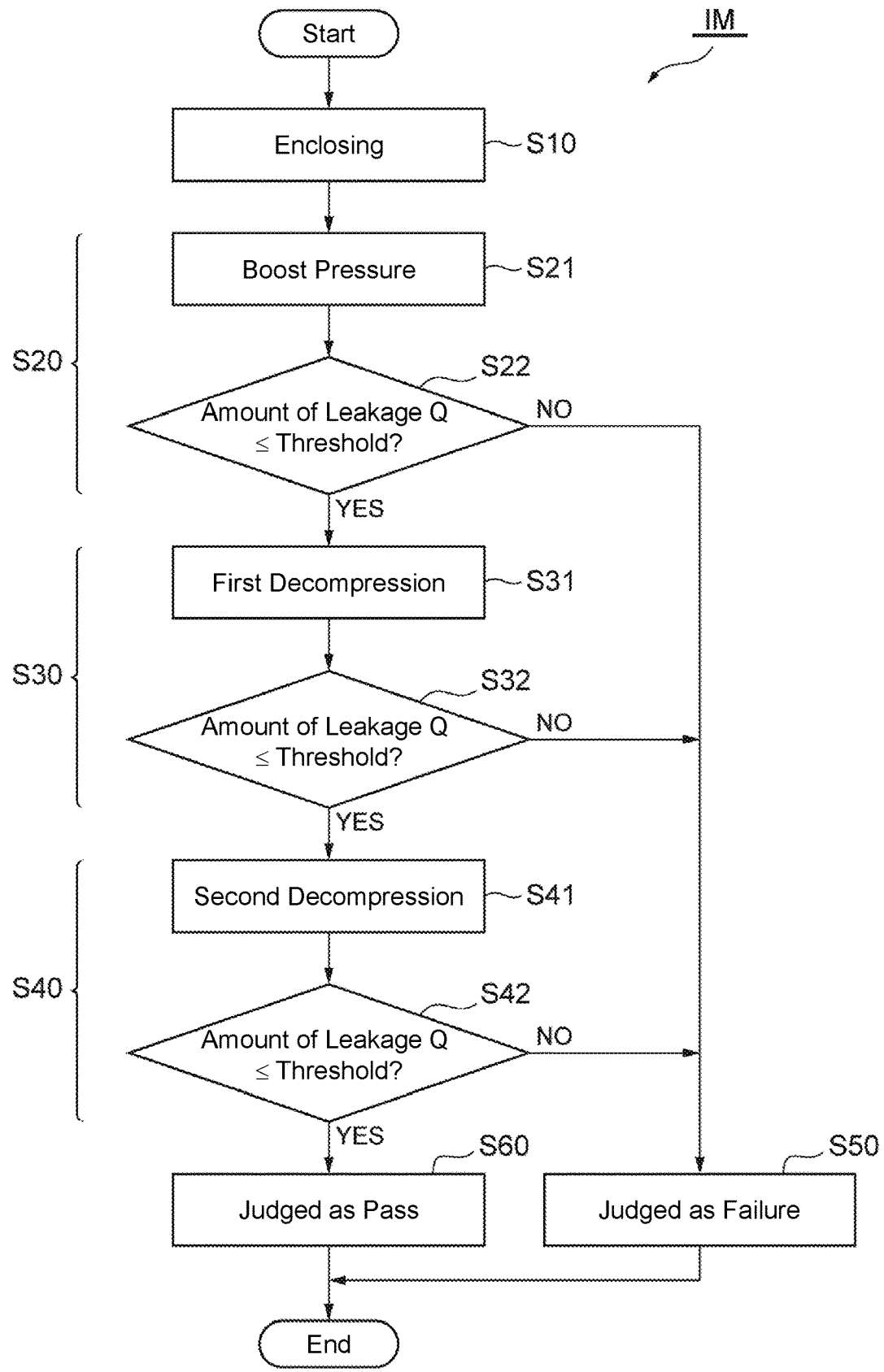
FIG. 7 is a flowchart of the inspection method according to the embodiments of the present disclosure.
Figure 8:
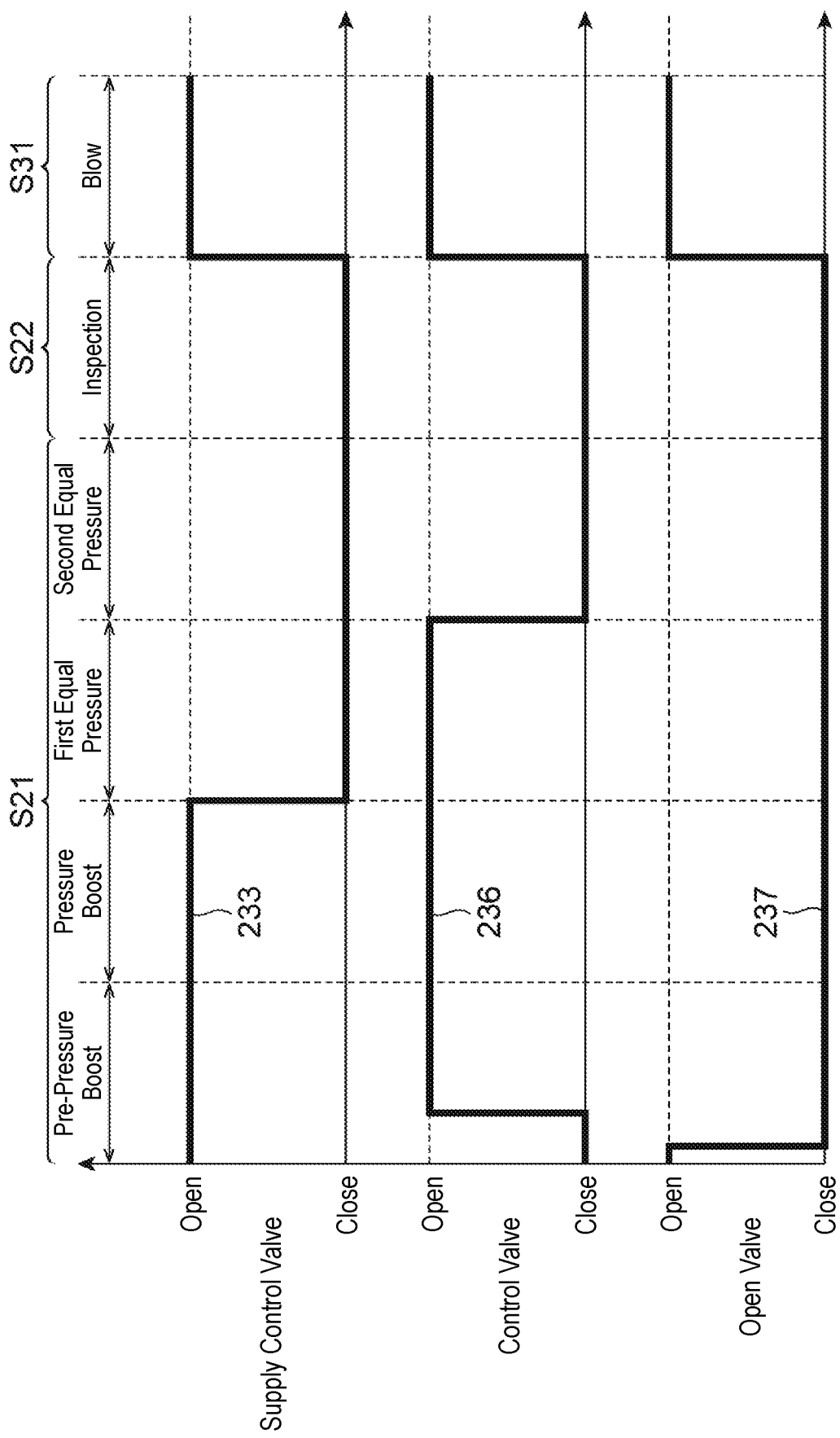
FIG. 8 is a timing chart illustrating open/close states of control valves in the inspection method illustrated in FIG. 7.

Finally, the following describes an inspection method IM according to this embodiment using the above-described inspection device 200 with reference to FIG. 7 and FIG. 8. FIG. 7 is a flowchart of the inspection method according to the embodiments of the present disclosure. FIG. 8 is a timing chart illustrating open/close states of the supply control valve 233, the control valve 236, and the open valve 237 in the inspection method IM illustrated in FIG. 7.

Although the details will be described later, the inspection method IM according to this embodiment is an inspection method for the fuel cell 40 or the fuel cell stack 100 that features the following configurations. The inspection method IM includes an enclosing step S10, an external leakage inspection step S20, and a communication leakage inspection step S30. The enclosing step S10 is a step of enclosing the first gas passage, the second gas passage, and the refrigerant passage in the fuel cell 40 or the fuel cell stack 100 from the outside and forming the three sections: the first section C1, the second section C2, and the third section C3 independent of one another. The external leakage inspection step S20 is a step of simultaneously supplying the inspection gas to two or more sections among the three sections for pressure boosting and performing the inspection for leakage of the inspection gas from the two or more sections to the outside after boosting the pressures. The communication leakage inspection step S30 is a step of decompressing one section among the two or more sections after boosting the pressures, maintaining the pressure at the other one section or the pressures of the other two sections, and performing the inspection for leakage of the inspection gas from the pressure-maintained one section or two sections to the decompressed one section.

The following describes the inspection method IM according to this embodiment in detail. Although the following description describes the leakage inspection of the fuel cell 40 by the inspection method IM, by replacing the fuel cell 40 with the fuel cell stack 100, the leakage inspection of the fuel cell stack 100 by the inspection method IM can be performed.

The inspection method IM according to this embodiment includes, for example, a cross leakage inspection step S40, a failure judging step S50, and a pass judging step S60, in addition to the above-described enclosing step S10, external leakage inspection step S20, and communication leakage inspection step S30.

The enclosing step S10 is a step of enclosing the first gas passage, the second gas passage, and the refrigerant passage in the fuel cell 40 from the outside and forms the three sections: the first section C1, the second section C2, and the third section C3 independent of one another. The enclosing step S10 can be performed, for example, as follows using the above-described inspection device 200.

The inspection device 200, for example, drives the drive unit in the enclosing unit 210 by the control arithmetic unit 240 to move the upper form 211 toward the fuel cell 40 disposed on the lower form 212 and holds the fuel cell 40 between the upper form 211 and the lower form 212. Accordingly, the enclosing unit 210 encloses the first gas passage, the second gas passage, and the refrigerant passage in the fuel cell 40 from the outside, thus ensuring forming the three sections: the first section C1, the second section C2, and the third section C3, independent of one another. As described above, the inspection device 200 can perform the enclosing step S10 in the inspection method IM.

Next, the external leakage inspection step S20 is performed. As described above, the external leakage inspection step S20 is a step of simultaneously supplying the inspection gas to two or more sections among the three sections: the first section C1, the second section C2, and the third section C3, for pressure boosting and performs the inspection for leakage of the inspection gas from the two or more sections to the outside after boosting the pressures. The external leakage inspection step S20 includes, for example, a pressure boosting step S21 and an external leakage judging step S22. The pressure boosting step S21 simultaneously supplies the inspection gas to two or more sections among the three sections for pressure boosting. The external leakage judging step S22 determines whether a leakage of the inspection gas from the two or more sections to the outside after boosting the pressures falls within an allowable range. The external leakage inspection step S20 can be performed as follows using the above-described inspection device 200.

First, the inspection device 200 performs the pressure boosting step S21, which simultaneously supplies the inspection gas to two or more sections among the three sections for pressure boosting. The control arithmetic unit 240 controls the gas supply unit 220 to supply the inspection gas from the gas supply unit 220 to the inspection units 230 corresponding to the respective sections: the first section C1, the second section C2, and the third section C3. At this time, the control arithmetic unit 240 performs the following control in the inspection units 230 corresponding to the two or more sections to be pressure-boosted among the three inspection units 230 corresponding to the three sections.

As illustrated in FIG. 8, in a state where the supply control valve 233 is opened, the control valve 236 is closed, and the open valve 237 is opened, the control arithmetic unit 240 first closes the open valve 237 and then opens the control valve 236. This ensures simultaneously supplying the inspection gas to the two or more sections among the three sections for pressure boosting while suppressing a sudden pressure boosting in each section (pre-pressure boosting). In a case that a section not to be pressure-boosted is present, the supply control valve 233, the control valve 236, and the open valve 237 in the inspection unit 230 corresponding to the section can be closed.

In the inspection device 200 according to this embodiment, in the inspection for external leakage, that is, the external leakage inspection step S20, the control arithmetic unit 240 simultaneously supplies the inspection gas to the three sections for pressure boosting. That is, the inspection method IM according to this embodiment simultaneously supplies the inspection gas to the three sections for pressure boosting in the external leakage inspection step S20. In the inspection device 200 according to this embodiment, the control arithmetic unit 240, for example, opens the coupling valve 261 of the coupling portion 260 coupling the first section C1 and the second section C2 when simultaneously supplying the inspection gas to the three sections for pressure boosting, and closes the coupling valve 261 after boosting the pressures of the three sections.

Additionally, the control arithmetic unit 240, for example, supplies the chamber 250 corresponding to each of the sections, that is, the first chamber 251, the second chamber 252, and the third chamber 253, with the inspection gas simultaneously with the three sections for pressure boosting. That is, the inspection method IM according to this embodiment supplies the inspection gas to the chamber 250 simultaneously with the three sections: the first section C1, the second section C2, and the third section C3, for pressure boosting in the external leakage inspection step S20. Specifically, the control arithmetic unit 240 opens the supply control valve 233 in the inspection unit 230 corresponding to each section to be pressure-boosted to distribute the inspection gas to each section to be pressure-boosted and the chamber 250 corresponding to each section.

Afterwards, the control arithmetic unit 240 continues supplying (pressure boosting) the inspection gas until each section to be pressure-boosted reaches a certain pressure. When each section to be pressure-boosted reaches a certain pressure, as illustrated in FIG. 8, the control arithmetic unit 240 closes the supply control valve 233 corresponding to each section. Thus, the supply of the inspection gas between each section to be pressure-boosted and the gas supply unit 220 is cut off. At this time, the control valve 236 maintains the open state. This maintains the coupling between each section to be pressure-boosted and the chamber 250 corresponding to each section and equalizes the pressure at each section and the pressure at the chamber 250 corresponding to each section (first equal pressure). Afterwards, the control arithmetic unit 240 closes the control valve 236 corresponding to each section to be pressure-boosted to cut off the coupling between each section and the chamber 250 and maintains the state (second equal pressure).

As described above, the inspection device 200 can perform the pressure boosting step S21 to simultaneously supply the inspection gas to two or more sections among the three sections: the first section C1, the second section C2, and the third section C3, for pressure boosting.

After terminating the pressure boosting step S21, the inspection device 200 performs the external leakage judging step S22. In the external leakage judging step S22, the control arithmetic unit 240 performs the inspection for leakage of the inspection gas from each pressure-boosted section based on the pressure measured by the pressure gauge 235 to perform the inspection for external leakage of the inspection gas from the two or more sections to the outside after boosting the pressures. Note that, with the inspection device 200 according to this embodiment, the control arithmetic unit 240 performs the inspection for external leakage of the three sections pressure-boosted at the pressure boosting step S21 in the external leakage judging step S22.

The control arithmetic unit 240, for example, calculates the amount of leakage of the inspection gas based on a differential pressure between the chamber 250 and each of the three sections to perform the inspection for leakage of the inspection gas from each section. That is, the inspection method IM according to this embodiment, for example, calculates the amount of leakage of the inspection gas from each section based on the differential pressure between the chamber 250 and each of the three sections in the external leakage inspection step S20, the communication leakage inspection step S30, and the cross leakage inspection step S40.

More specifically, the control arithmetic unit 240 measures each of a differential pressure $\Delta P$ between the first chamber 251 and the first section C1, the differential pressure $\Delta P$ between the second chamber 252 and the second section C2, and the differential pressure $\Delta P$ between the third chamber 253 and the third section C3 for a certain measured time T by the pressure gauges 235 as differential pressure gauges in the external leakage judging step S22. The control arithmetic unit 240 calculates the amount of leakage Q from each section based on the formula (1).

Furthermore, the control arithmetic unit 240 compares a preliminarily stored threshold with the amount of leakage Q from each section in the external leakage judging step S22. Consequently, in a case where the amount of leakage Q of any of the sections exceeds the threshold (NO), the control arithmetic unit 240 performs the failure judging step S50 and judges a result of the leakage inspection of the fuel cell 40 as failure. On the other hand, in a case where the amounts of leakage Q of all sections are equal to or less than the threshold (YES), the communication leakage inspection step S30 is performed.

As described above, the inspection device 200 can perform the external leakage judging step S22 included in the external leakage inspection step S20 in the inspection method IM and determine whether the leakage of the inspection gas from two or more sections to the outside after boosting the pressures falls within an allowable range.

After terminating the external leakage judging step S22, the inspection device 200 performs the communication leakage inspection step S30. The communication leakage inspection step S30 includes, for example, a first decompression step S31 and a communication leakage judging step S32. The first decompression step S31 is a step of, for example, decompressing one section among the two or more sections after boosting the pressures, which have been pressure-boosted in the external leakage inspection step S20, and maintains the pressure of the other one section or the pressures of the other two sections. The communication leakage judging step S32 is a step of performing the inspection for communication leakage of the inspection gas from the one section or the two sections whose pressures have been maintained to the one section that has been decompressed in the first decompression step S31 and determines whether the amount of leakage Q is equal to or less than the threshold.

More specifically, the inspection device 200 can perform the first decompression step S31 as follows. As illustrated in FIG. 8, the inspection device 200 opens the supply control valve 233, the control valve 236, and the open valve 237 in the inspection unit 230 corresponding to one section among the three sections: the first section C1, the second section C2, and the third section C3 pressure-boosted in the external leakage inspection step S20 by control by the control arithmetic unit 240. Accordingly, the inspection gas is discharged from the one section, and the pressure at the one section decreases (blows).

The inspection method IM according to this embodiment, for example, decompresses the third section C3 including the refrigerant passage and performs the inspection for leakage of the inspection gas from the pressure-maintained first section C1 and second section C2 to the third section C3 in the communication leakage inspection step S30. In this case, the inspection device 200 opens the supply control valve 233, the control valve 236, and the open valve 237 in the inspection unit 230 corresponding to the third section C3 by the control arithmetic unit 240, decreases the pressure at the third section C3, and maintains the pressures at the first section C1 and the second section C2.

As described above, the inspection device 200 can perform the first decompression step S31 to decompress one section among the two or more sections after boosting the pressures, which have been pressure-boosted in the external leakage inspection step S20, and maintain the pressure at the other one section or the pressures of the other two sections.

After terminating the first decompression step S31, the inspection device 200 performs the communication leakage judging step S32. The control arithmetic unit 240 performs the inspection for communication leakage of the inspection gas from the pressure-maintained one section or two sections without being decompressed in the first decompression step S31 to the one section decompressed in the first decompression step S31. More specifically, the control arithmetic unit 240, for example, performs the inspection for leakage of the inspection gas from the two sections, the pressure-maintained first section C1 and second section C2, to the decompressed third section C3 and determines whether the amount of leakage Q is equal to or less than the threshold.

In detail, the control arithmetic unit 240 measures each of the differential pressure ΔP between the first chamber 251 and the first section C1 and the differential pressure ΔP between the second chamber 252 and the second section C2 for the certain measured time T by the pressure gauges 235 as the differential pressure gauges in the communication leakage judging step S32. The control arithmetic unit 240 calculates the amount of leakage Q of the inspection gas from the first section C1 to the third section C3 and the amount of leakage Q of the inspection gas from the second section C2 to the third section C3 based on the formula (1).

Furthermore, the control arithmetic unit 240 compares the preliminarily stored threshold with the amount of leakage Q from each section in the communication leakage judging step S32. Consequently, in a case where the amount of leakage Q of any of the sections exceeds the threshold (NO), the control arithmetic unit 240 performs the failure judging step S50 and judges a result of the leakage inspection of the fuel cell 40 as failure. On the other hand, in a case where the amounts of leakage Q of both sections are equal to or less than the threshold (YES), the cross leakage inspection step S40 is performed.

As described above, the inspection device 200 can perform the communication leakage judging step S32 included in the communication leakage inspection step S30 in the inspection method IM and determine whether the communication leakage of the inspection gas from the first section C1 and the second section C2 to the third section C3 falls within an allowable range.

After terminating the communication leakage judging step S32, the inspection device 200 performs the cross leakage inspection step S40. That is, the inspection method IM includes the cross leakage inspection step S40. The cross leakage inspection step S40 includes, for example, a second decompression step S41 and a cross leakage judging step S42. The second decompression step S41 is a step of decompressing one section among the pressure-maintained first section C1 and second section C2 after the communication leakage inspection step S30 and maintains the pressure at the other one section. The cross leakage judging step S42 is, for example, a step of performing the inspection for leakage of the inspection gas from the one section whose pressure is maintained to the one section decompressed in the second decompression step S41 and determines whether the amount of leakage Q is equal to or less than the threshold.

More specifically, the inspection device 200 can perform the second decompression step S41 as follows. The inspection device 200 opens the supply control valve 233, the control valve 236, and the open valve 237 in the inspection unit 230 corresponding to one section among the two sections, the first section C1 and the second section C2 whose pressures have been maintained in the communication leakage inspection step S30 by the control arithmetic unit 240, similarly to the first decompression step S31 illustrated in FIG. 8. This discharges the inspection gas from the one section and decreases (blows) the pressure at the one section.

In the inspection method IM according to this embodiment, for example, a pressure difference between before and after the decompression of the first section C1 or the second section C2 in the cross leakage inspection step S40 is smaller than the pressure difference before and after the decompression of the third section C3 in the above-described communication leakage inspection step S30. That is, the control arithmetic unit 240 configures, for example, the pressure difference between the second section C2 and the first section C1 after the decompression in the inspection for cross leakage to be smaller than the pressure difference between the third section C3 after the decompression and the pressure-maintained first section C1 and second section C2 in the inspection for communication leakage.

More specifically, as described above, the inspection device 200 according to this embodiment includes the precompression unit 270 coupled to the first section C1 or the second section C2. In the examples illustrated in FIG. 4 and FIG. 5, the precompression unit 270 is coupled to the open flow passage 234 in the inspection unit 230 corresponding to the second section C2. In the cross leakage inspection step S40, the control arithmetic unit 240 discharges the inspection gas of one section to be decompressed, for example, the second section C2, to the precompression unit 270 to which the precompression higher than the atmospheric pressure is given.

As described above, the inspection device 200 performs the second decompression step S41 included in the cross leakage inspection step S40 and decompresses one section among the first section C1 and the second section C2 whose pressures have been maintained in the communication leakage inspection step S30, thus ensuring maintaining the pressure at the other one section.

In this embodiment, after terminating the second decompression step S41, the inspection device 200 performs the cross leakage judging step S42. The control arithmetic unit 240 performs the inspection for cross leakage of the inspection gas from the pressure-maintained one section without being decompressed in the second decompression step S41 to the one section decompressed in the second decompression step S41. More specifically, the control arithmetic unit 240, for example, performs the inspection for cross leakage of the inspection gas from the pressure-maintained first section C1 to the decompressed second section C2 and determines whether the amount of leakage Q is equal to or less than the threshold.

In detail, the control arithmetic unit 240 measures the differential pressure ΔP between the first chamber 251 and the first section C1 for the certain measured time T by the pressure gauge 235 as the differential pressure gauge in the cross leakage judging step S42. The control arithmetic unit 240 calculates the amount of leakage Q from the first section C1 to the second section C2 based on the formula (1).

Furthermore, the control arithmetic unit 240 compares the preliminarily stored threshold with the amount of leakage Q from the first section C1 to the second section C2 in the cross leakage judging step S42. Consequently, in a case where the amount of leakage Q exceeds the threshold (NO), the control arithmetic unit 240 performs the failure judging step S50 and judges a result of the leakage inspection of the fuel cell 40 as failure. Meanwhile, in a case where the amount of leakage Q is equal to or less than the threshold (YES), the pass judging step S60 is performed and the result of the leakage inspection of the fuel cell 40 is judged as pass.

As described above, the inspection device 200 can perform the cross leakage judging step S42 included in the cross leakage inspection step S40 in the inspection method IM and determine whether the cross leakage of the inspection gas between the first section C1 and the second section C2 falls within an allowable range.

As described above, the inspection method IM according to this embodiment is the inspection method for the fuel cell 40 or the fuel cell stack 100 and includes the enclosing step S10, the external leakage inspection step S20, and the communication leakage inspection step S30. The enclosing step S10 is a step of enclosing the first gas passage, the second gas passage, and the refrigerant passage in the fuel cell 40 or the fuel cell stack 100 from the outside and forming the three sections: the first section C1, the second section C2, and the third section C3 independent of one another. The external leakage inspection step S20 is a step of simultaneously supplying the inspection gas to two or more sections among the three sections for pressure boosting and performing the inspection for leakage of the inspection gas from the two or more sections to the outside after boosting the pressures. The communication leakage inspection step S30 is a step of decompressing one section among the two or more sections after boosting the pressures, maintaining the pressure at the other one section or the pressures of the other two sections, and performing the inspection for leakage of the inspection gas from the pressure-maintained one section or two sections to the decompressed one section.

The inspection device 200 according to this embodiment is a device to inspect the fuel cell 40 or the fuel cell stack 100 and has the following configurations. The enclosing unit 210 encloses the first gas passage, the second gas passage, and the refrigerant passage in the fuel cell 40 or the fuel cell stack 100 from the outside to form three sections independent of one another: the first section C1, the second section C2, and the third section C3. The gas supply unit 220 independently supplies the inspection gas to the three respective sections for pressure boosting. The pressure gauge 235 measures the pressures at the respective sections. The control valve 236 ensures discharging the inspection gas from each section. The control arithmetic unit 240 controls the gas supply unit 220 and the control valve 236 and performs the inspection for leakage of the inspection gas from each section based on the pressure measured by the pressure gauge 235. The control arithmetic unit 240 simultaneously supplies the inspection gas to two or more sections among the three sections for pressure boosting to perform the inspection for external leakage of the inspection gas from the two or more sections to the outside after boosting the pressures. Additionally, after performing the inspection for external leakage, the control arithmetic unit 240 decompresses one section among the two or more sections after boosting the pressures and maintains a pressure of the other one section or pressures of other two sections to perform the inspection for communication leakage of the inspection gas from the pressure-maintained one section or two sections to the decompressed one section.

The inspection device 200 having the configuration can perform the inspection method IM. More specifically, in the inspection device 200, the enclosing unit 210 encloses the first gas passage, the second gas passage, and the refrigerant passage in the fuel cell 40 or the fuel cell stack 100 from the outside, thus ensuring forming the three sections: the first section C1, the second section C2, and the third section C3, independent of one another. Thus, the inspection device 200 can perform the enclosing step S10 in the inspection method IM.

Additionally, the inspection device 200 can control the gas supply unit 220 by the control arithmetic unit 240 and independently supply the inspection gas to the respective three sections: the first section C1, the second section C2, and the third section C3, for pressure boosting. Thus, the inspection device 200 performs the pressure boosting step S21 included in the external leakage inspection step S20 in the inspection method IM and simultaneously supply the inspection gas to two or more sections among the three sections for pressure boosting.

Furthermore, the inspection device 200 can perform the inspection for external leakage of the inspection gas from each section to the outside by the control arithmetic unit 240 based on the pressure at each section measured by the pressure gauge 235. That is, the inspection device 200 can perform the external leakage inspection step S20 in the inspection method IM.

Generally, compared with the decompression of each section, the pressure boosting of each section including the first gas passage, the second gas passage, and the refrigerant passage in the fuel cell 40 or the fuel cell stack 100 substantially takes time. However, in this embodiment, the inspection gas can be simultaneously supplied to two or more sections among the three sections for pressure boosting in the external leakage inspection step S20. Therefore, with this embodiment, compared with the case of sequentially supplying the inspection gas to the sections one by one for pressure boosting, the overall time taken for the inspection method IM can be substantially shortened.

The inspection device 200 can control the control valve 236 by the control arithmetic unit 240 and discharge the inspection gas from each section filled with the inspection gas after boosting the pressure to decompress each section after boosting the pressure. Moreover, the inspection device 200 can perform the inspection for leakage of the inspection gas from each section by the control arithmetic unit 240 based on the pressure measured by the pressure gauge 235. Therefore, with this embodiment, the leakage inspection of the fuel cell 40 can be performed minutely in a shorter time compared with the conventional inspection.

That is, as described above, the inspection device 200 can perform the communication leakage inspection step S30 that decompresses one section among the two or more sections after boosting the pressures, maintains the pressure of the other one section or the pressures of the other two sections, and performs the inspection for communication leakage of the inspection gas from the pressure-maintained one section or two sections to the decompressed one section. In the communication leakage inspection step S30, each section needs not to be pressure-boosted after the external leakage inspection step S20 and it is only necessary to decompress the already pressure-boosted one section. Therefore, the time until starting the communication leakage inspection step S30 after terminating the external leakage inspection step S20 can be shortened.

Furthermore, among the three sections including the first gas passage, the second gas passage, and the refrigerant passage in the fuel cell 40 that has passed the inspection for external leakage, the inspection for leakage of the inspection gas from any one section or two sections to the other section(s) can be performed. Accordingly, the inspection method IM and the inspection device 200 according to this embodiment can perform the leakage inspection of the fuel cell 40 or the fuel cell stack 100 minutely in a shorter time compared with the conventional inspection.

Additionally, with the inspection device 200 according to this embodiment, the control arithmetic unit 240, for example, simultaneously supplies the inspection gas to the three sections: the first section C1, the second section C2, and the third section C3, for pressure boosting, and performs the inspection for external leakage of the three sections after boosting the pressures in the inspection for external leakage. The control arithmetic unit 240, for example, decompresses one section among the three sections after boosting the pressures and maintains the pressures at the other two sections in the inspection for communication leakage.

That is, the inspection method IM according to this embodiment simultaneously supplies the inspection gas to the three sections for pressure boosting and performs the inspection for leakage of the inspection gas from the three sections to the outside after boosting the pressures in the external leakage inspection step S20. Additionally, the inspection method IM according to this embodiment decompresses one section among the three sections after boosting the pressures and maintains the pressures at the other two sections in the communication leakage inspection step S30.

Although pressure-boosting the respective sections comparatively takes time, the configuration ensures collective-pressure-boosting the three sections in the external leakage inspection step S20. This ensures further substantially shortening the time required for the inspection method IM compared with a case where the inspection gas is sequentially supplied to the sections one by one for pressure boosting and a case where two sections among the three sections are collective-pressure-boosted and the one section is then pressure-boosted. Accordingly, the inspection method IM and the inspection device 200 according to this embodiment can perform the leakage inspection of the fuel cell 40 or the fuel cell stack 100 minutely in a shorter time compared with the conventional inspection.

With the inspection device 200 according to this embodiment, the control arithmetic unit 240 decompresses the third section C3 including the refrigerant passage to perform the inspection for communication leakage from the pressure-maintained first section C1 and second section C2 to the third section C3 in the inspection for communication leakage.

That is, the inspection method IM according to this embodiment decompresses the third section C3 including the refrigerant passage and performs the inspection for leakage of the inspection gas from the pressure-maintained first section C1 and second section C2 to the third section C3 in the communication leakage inspection step S30.

The configuration ensures suppressing generation of a high differential pressure between the first section C1 including the first gas passage in the fuel cell 40 and the second section C2 including the second gas passage in the fuel cell 40 in the communication leakage inspection step S30. This ensures avoiding a failure caused by the differential pressure between the first gas passage and the second gas passage in each unit of the fuel cell 40 including the MEGA 41. Therefore, the first gas passage and the second gas passage in the fuel cell 40 can be pressure-boosted to pressures equal to more than an operating pressure, and the communication leakage from the first gas passage and the second gas passage to the refrigerant passage can be inspected in the communication leakage inspection step S30. Accordingly, the inspection method IM and the inspection device 200 according to this embodiment can perform the leakage inspection of the fuel cell 40 or the fuel cell stack 100 minutely in a shorter time compared with the conventional inspection.

Additionally, with the inspection device 200 according to this embodiment, after performing the inspection for communication leakage, the control arithmetic unit 240 decompresses one section among the pressure-maintained first section C1 and second section C2 and maintains the pressure at the other one section to perform the inspection for cross leakage of the inspection gas from the pressure-maintained one section to the decompressed one section.

That is, the inspection method IM according to this embodiment includes the cross leakage inspection step S40 that decompresses one section among the pressure-maintained first section C1 and second section C2 and maintains the pressure at the other one section to perform the inspection for leakage of the inspection gas from the pressure-maintained one section to the decompressed one section after the communication leakage inspection step S30.

The configuration eliminates the need for pressure-boosting the first section C1 or the second section C2 and it is only necessary to decompress any one of the already pressure-boosted first section C1 or second section C2 in the cross leakage inspection step S40. Therefore, after terminating the communication leakage inspection step S30, the time until starting the cross leakage inspection step S40 can be shortened. Additionally, the cross leakage of the inspection gas between the first section C1 and the second section C2 can be inspected. Accordingly, the inspection method IM and the inspection device 200 according to this embodiment can perform the leakage inspection of the fuel cell 40 or the fuel cell stack 100 minutely in a shorter time compared with the conventional inspection.

Moreover, the inspection device 200 according to this embodiment includes the coupling portion 260, which couples the first section C1 including the first gas passage in the fuel cell 40 and the second section C2 including the second gas passage in the fuel cell 40, and the coupling valve 261, which is disposed on the coupling portion 260 and controlled by the control arithmetic unit 240. In the inspection for external leakage, when the control arithmetic unit 240 simultaneously supplies the inspection gas to the three sections: the first section C1, the second section C2, and the third section C3 for pressure boosting, the control arithmetic unit 240 opens the coupling valve 261, and closes the coupling valve 261 after boosting the pressures of the three sections.

That is, when the inspection gas is simultaneously supplied to the three sections for pressure boosting in the external leakage inspection step S20, the inspection method IM according to this embodiment couples the first section C1 including the first gas passage in the fuel cell 40 and the second section C2 including the second gas passage in the fuel cell 40 and cuts off the coupling between the first section C1 and the second section C2 after boosting the pressures of the three sections.

The configuration ensures opening the coupling valve 261 to couple the first section C1 and the second section C2 via the coupling portion 260 and cutting off between the first section C1 and the second section C2 as necessary in the external leakage inspection step S20. Accordingly, when an external leakage occurs in the first section C1 or the second section C2, an excessive differential pressure between the first gas passage and the second gas passage in the fuel cell 40 can be avoided, thus ensuring avoiding damage of each unit of the fuel cell 40 including the MEGA 41.

The inspection device 200 according to this embodiment includes the chamber 250 coupled to the gas supply unit 220. Further, the pressure gauge 235 is the differential pressure gauge that measures the differential pressure between the chamber 250 and each of the three sections: the first section C1, the second section C2, and the third section C3.

The configuration ensures the inspection device 200 to measure the differential pressure between each section and the chamber 250. That is, the inspection device 200 can measure the pressure at each section by the pressure gauge 235 using the pressure of the inspection gas in the chamber 250 as reference where the pressure is maintained constant. Accordingly, the inspection device 200 according to this embodiment can perform the leakage inspection of the fuel cell 40 or the fuel cell stack 100 minutely in a shorter time compared with the conventional inspection.

With the inspection device 200 according to this embodiment, the control arithmetic unit 240 configures the pressure difference between before and after the decompression of the first section C1 or the second section C2 in the inspection for cross leakage to be smaller than the pressure difference between before and after the decompression of the third section C3 in the inspection for communication leakage.

That is, in the inspection method IM according to this embodiment, the pressure difference between before and after the decompression of the first section C1 or the second section C2 in the cross leakage inspection step S40 is smaller than the pressure difference between before and after the decompression of the third section C3 in the communication leakage inspection step S30.

More specifically, the inspection device 200 according to this embodiment includes the precompression unit 270 coupled to the first section C1 or the second section C2. In the inspection for cross leakage, the control arithmetic unit 240 discharges the inspection gas of the decompressed one section to the precompression unit 270 where a precompression higher than the atmospheric pressure is given.

The configuration ensures avoiding the excessive differential pressure between the first section C1 including the first gas passage in the fuel cell 40 and the second section C2 in the fuel cell 40 in the cross leakage inspection step S40. Accordingly, while damage of each unit of the fuel cell 40 including the MEGA 41 is avoided, the first section C1 or the second section C2 can be decompressed after terminating the communication leakage inspection step S30. Thus, compared with a case where the first section C1 or the second section C2 is pressure-boosted in the cross leakage inspection step S40, the time until starting the cross leakage inspection step S40 after terminating the communication leakage inspection step S30 can be shortened. Accordingly, the inspection method IM and the inspection device 200 according to this embodiment can perform the leakage inspection of the fuel cell 40 or the fuel cell stack 100 minutely in a shorter time compared with the conventional inspection.

Moreover, with the inspection device 200 according to this embodiment, the control arithmetic unit 240 supplies the inspection gas to the chamber 250 simultaneously with the three sections: the first section C1, the second section C2, and the third section C3, for pressure boosting in the inspection for external leakage. The control arithmetic unit 240 calculates the amount of leakage of the inspection gas based on the differential pressure between the chamber 250 and each section of the three sections to perform the inspection for leakage of the inspection gas.

That is, the inspection method IM according to this embodiment supplies the inspection gas to the chamber 250 simultaneously with the three sections for pressure boosting in the external leakage inspection step S20. The amount of leakage Q of the inspection gas from each section is calculated based on the differential pressure between the chamber 250 and each of the three sections in the external leakage inspection step S20, the communication leakage inspection step S30, and the cross leakage inspection step S40.

The configuration ensures calculating the amounts of leakage Q of the inspection gas from the respective sections: the first section C1 including the first gas passage in the fuel cell 40, the second section C2 including the second gas passage in the fuel cell 40, and the third section C3 including the refrigerant passage in the fuel cell 40, by the formula (1). Therefore, in the external leakage inspection step S20, the amount of leakage Q of the external leakage of the inspection gas from each of the sections in the fuel cell 40 or the fuel cell stack 100 to the outside can be calculated.

In the communication leakage inspection step S30, the amount of leakage Q of the communication leakage of the inspection gas from the first section C1 and the second section C2 to the third section C3 in the fuel cell 40 or the fuel cell stack 100 that has passed the inspection for external leakage can be calculated. Furthermore, in the cross leakage inspection step S40, the amount of leakage Q of the cross leakage of the inspection gas between the first section C1 and the second section C2 in the fuel cell 40 or the fuel cell stack 100 that has passed the inspection for communication leakage can be calculated.

The inspection method IM and the inspection device 200 according to this embodiment can perform the leakage inspection of the fuel cell 40 alone. The inspection method IM and the inspection device 200 according to this embodiment can perform the leakage inspection of the fuel cell stack 100 in which the plurality of fuel cells 40 are stacked.

As described above, this embodiment can provide the inspection method IM and the inspection device 200 of the fuel cell 40 or the fuel cell stack 100 that can perform the leakage inspection minutely in a shorter time compared with the conventional inspection.

While the embodiments of the inspection method and the inspection device according to the present disclosure have been described in detail with reference to the drawings, the specific configuration is not limited thereto. Design changes and the like within a scope not departing from the gist of the present disclosure are included in the present disclosure.

DESCRIPTION OF SYMBOLS

4 Fuel cell
45 Flow passage groove (first gas passage)
46 Flow passage groove (refrigerant passage)
47 Flow passage groove (second gas passage)
51 First gas flow passage (first gas passage)
100 Fuel cell stack
200 Inspection device 210 Enclosing unit
220 Gas supply unit
235 Pressure gauge (differential pressure gauge)
236 Control valve
240 Control arithmetic unit
250 Chamber
260 Coupling portion
261 Coupling valve
270 Precompression unit
C1 First section
C2 Second section
C3 Third section
H1 Manifold hole (first gas passage)
H2 Manifold hole (first gas passage)
H3 Manifold hole (second gas passage)
H4 Manifold hole (second gas passage)
H5 Manifold hole (refrigerant passage)
H6 Manifold hole (refrigerant passage)
h1 Manifold opening (first gas passage)
h2 Manifold opening (first gas passage)
h3 Manifold opening (second gas passage)
h4 Manifold opening (second gas passage)
h5 Manifold opening (refrigerant passage)
h6 Manifold opening (refrigerant passage)
IM Inspection method
M1 Manifold (first gas passage)
M2 Manifold (first gas passage)
M3 Manifold (second gas passage)
M4 Manifold (second gas passage)
M5 Manifold (refrigerant passage)
M6 Manifold (refrigerant passage)
S10 Enclosing step
S20 External leakage inspection step
S30 Communication leakage inspection step
S40 Cross leakage inspection step

What is claimed is:

1. An inspection method for a fuel cell or a fuel cell stack, comprising:
   an enclosing step of enclosing a first gas passage, a second gas passage, and a refrigerant passage in the fuel cell or the fuel cell stack from an outside to form three sections, the three sections being a first section, a second section, and a third section independent of one another;
   an external leakage inspection step of simultaneously supplying an inspection gas to two or more sections among the three sections for pressure boosting to perform an inspection for leakage of the inspection gas from the two or more sections to the outside after boosting pressures; and
   a communication leakage inspection step of decompressing one section among the two or more sections after boosting the pressures while maintaining a pressure of another one section or pressures of other two sections to perform an inspection for leakage of the inspection gas from the pressure-maintained one section or two sections to the decompressed one section.

2. The inspection method according to claim 1,
   wherein the external leakage inspection step simultaneously supplies the inspection gas to the three sections for pressure boosting to perform the inspection for leakage of the inspection gas from the three sections to the outside after boosting the pressures, and
   wherein the communication leakage inspection step decompresses one section among the three sections after boosting the pressure and maintains pressures at other two sections.

3. The inspection method according to claim 2,
   wherein the communication leakage inspection step decompresses the third section including the refrigerant passage to perform the inspection for leakage of the inspection gas from the pressure-maintained first section and second section to the third section.

4. The inspection method according to claim 3, further comprising
   a cross leakage inspection step after the communication leakage inspection step, the cross leakage inspection step decompressing one section among the pressure-maintained first section and second section while maintaining a pressure at another one section to perform an inspection for leakage of the inspection gas from the pressure-maintained one section to the decompressed one section.

5. The inspection method according to claim 4,
   wherein a pressure difference between before and after the decompression of the first section or the second section in the cross leakage inspection step is smaller than a pressure difference between before and after the decompression of the third section in the communication leakage inspection step.

6. The inspection method according to claim 4,
   wherein the external leakage inspection step supplies the inspection gas to a chamber simultaneously with the three sections for pressure boosting, and
   wherein an amount of leakage of the inspection gas from each of the sections is calculated based on a differential pressure between the chamber and each of the three sections in the external leakage inspection step, the communication leakage inspection step, and the cross leakage inspection step.

7. An inspection device for a fuel cell or a fuel cell stack, comprising:
   an enclosing unit that encloses a first gas passage, a second gas passage, and a refrigerant passage in the fuel cell or the fuel cell stack from an outside to form three sections, the three sections being a first section, a second section, and a third section independent of one another;
   a gas supply unit that independently supplies each of the three sections with an inspection gas for pressure boosting;
   a pressure gauge that measures a pressure at each of the sections;
   a control valve capable of discharging the inspection gas from each of the sections; and
   a control arithmetic unit that controls the gas supply unit and the control valve, the control arithmetic unit performing an inspection for leakage of the inspection gas from each of the sections based on the pressure measured by the pressure gauge,
   wherein the control arithmetic unit simultaneously supplies the inspection gas to two or more sections among the three sections for pressure boosting to perform an inspection for external leakage of the inspection gas from the two or more sections to the outside after boosting the pressures, the control arithmetic unit subsequently decompressing one section among the two or more sections after boosting the pressures while maintaining a pressure of another one section or pressures of other two sections to perform an inspection for communication leakage of the inspection gas from the pressure-maintained one section or two sections to the decompressed one section.

8. The inspection device according to claim 7,
wherein the control arithmetic unit simultaneously supplies the inspection gas to the three sections for pressure boosting to perform the inspection for external leakage from the three sections after boosting the pressures in the inspection for external leakage, the control arithmetic unit decompressing one section among the three sections after boosting the pressures while maintaining pressures at other two sections in the inspection for communication leakage.

9. The inspection device according to claim 8,
wherein the control arithmetic unit decompresses the third section including the refrigerant passage to perform the inspection for communication leakage from the pressure-maintained first section and second section to the third section in the inspection for communication leakage.

10. The inspection device according to claim 9,
wherein the control arithmetic unit performs an inspection for cross leakage after the inspection for communication leakage, the control arithmetic unit decompressing one section among the pressure-maintained first section and second section while maintaining a pressure at another one section to perform the inspection for cross leakage of the inspection gas from the pressure-maintained one section to the decompressed one section.

11. The inspection device according to claim 10,
wherein the control arithmetic unit configures a pressure difference between before and after the decompression of the first section or the second section in the inspection for cross leakage to be smaller than a pressure difference between before and after the decompression of the third section in the inspection for communication leakage.

12. The inspection device according to claim 11, further comprising
a precompression unit coupled to the first section or the second section,
wherein the control arithmetic unit discharges the inspection gas of the one section to be decompressed to the precompression unit where a precompression higher than an atmospheric pressure is given, in the inspection for cross leakage.

13. The inspection device according to claim 8, further comprising:
a coupling portion that couples the first section including the first gas passage and the second section including the second gas passage; and
a coupling valve disposed on the coupling portion and controlled by the control arithmetic unit,
wherein in the inspection for external leakage, the control arithmetic unit opens the coupling valve when the control arithmetic unit simultaneously supplies the inspection gas to the three sections for pressure boosting, and closes the coupling valve after boosting the pressures of the three sections.

14. The inspection device according to claim 7, further comprising
a chamber coupled to the gas supply unit,
wherein the pressure gauge is a differential pressure gauge that measures a differential pressure between each of the three sections and the chamber.

15. The inspection device according to claim 14,
wherein the control arithmetic unit supplies the inspection gas to the chamber simultaneously with the three sections for pressure boosting and calculates an amount of leakage of the inspection gas based on the differential pressure between the chamber and each of the three sections to perform the inspection for leakage in the inspection for external leakage.

* * * * *